(12) United States Patent
Mahlmeister et al.

(10) Patent No.: US 11,484,789 B2
(45) Date of Patent: *Nov. 1, 2022

(54) METHODS, SYSTEMS, AND DEVICES OF SOCIAL NETWORKING WITH PORTIONS OF RECORDED GAME CONTENT

(71) Applicant: STEELSERIES ApS, Frederiksberg (DK)

(72) Inventors: Jeffrey Nicholas Mahlmeister, Glenview, IL (US); Thane Kurt Woidan, Chicago, IL (US); Thomas J. Panfil, La Grange, IL (US); Tino Soelberg, Chicago, IL (US)

(73) Assignee: STEELSERIES ApS, Frederiksberg (DK)

( * ) Notice: Subject to any disclaimer, the term of this patent is extended or adjusted under 35 U.S.C. 154(b) by 232 days.

This patent is subject to a terminal disclaimer.

(21) Appl. No.: 16/585,979

(22) Filed: Sep. 27, 2019

(65) Prior Publication Data

US 2020/0147489 A1 May 14, 2020

Related U.S. Application Data

(60) Provisional application No. 62/758,069, filed on Nov. 9, 2018.

(51) Int. Cl.
*A63F 13/497* (2014.01)
*A63F 13/79* (2014.01)
(Continued)

(52) U.S. Cl.
CPC ........ *A63F 13/497* (2014.09); *A63F 13/5378* (2014.09); *A63F 13/79* (2014.09); *A63F 13/798* (2014.09); *A63F 13/86* (2014.09); *A63F 13/28* (2014.09); *A63F 13/35* (2014.09); *A63F 13/355* (2014.09); *A63F 13/54* (2014.09); *A63F 13/69* (2014.09); *A63F 13/843* (2014.09); *A63F 13/847* (2014.09); *A63F 13/85* (2014.09); *A63F 13/95* (2014.09); *A63F 13/98* (2014.09); *A63F 2300/408* (2013.01); *A63F 2300/537* (2013.01); *A63F 2300/538* (2013.01); *A63F 2300/558* (2013.01); *A63F 2300/5546* (2013.01);
(Continued)

(58) Field of Classification Search
CPC .......... A63F 13/86; A63F 13/35; A63F 13/12; A63F 13/10; H04N 21/4788; H04N 21/4781; H04L 12/58; H04L 51/046; G06F 9/54
USPC ....................................................... 709/206
See application file for complete search history.

(56) References Cited

U.S. PATENT DOCUMENTS 6,425,827 B1 7/2002 Nimura
8,279,051 B2 10/2012 Khan
(Continued)

*Primary Examiner* — Mahran Y Abu Roumi
(74) *Attorney, Agent, or Firm* — Guntin & Gust, PLC; Andrew Gust

(57) ABSTRACT

Embodiments include a system and method that facilitate detecting a request from a player to share a trigger clip of a video game, preparing the trigger clip for sharing and sharing the trigger clip in a message to a third party or to a social media destination. Additional embodiments include storing one or more trigger clips in a library where the trigger clips are available for searching and review by players and others. Advantages include making the trigger clips available for subsequent review, training, coaching and other purposes.

20 Claims, 27 Drawing Sheets

(51) Int. Cl.

| | |
|---|---|
| *A63F 13/5378* | (2014.01) |
| *A63F 13/86* | (2014.01) |
| *A63F 13/798* | (2014.01) |
| *A63F 13/28* | (2014.01) |
| *A63F 13/98* | (2014.01) |
| *A63F 13/95* | (2014.01) |
| *A63F 13/843* | (2014.01) |
| *A63F 13/355* | (2014.01) |
| *A63F 13/85* | (2014.01) |
| *H04L 51/046* | (2022.01) |
| *H04L 51/10* | (2022.01) |
| *A63F 13/54* | (2014.01) |
| *A63F 13/69* | (2014.01) |
| *A63F 13/35* | (2014.01) |
| *G06N 20/00* | (2019.01) |
| *H04L 67/06* | (2022.01) |
| *A63F 13/847* | (2014.01) |
| *H04L 51/52* | (2022.01) |

(52) U.S. Cl.
CPC ........ *A63F 2300/634* (2013.01); *G06N 20/00* (2019.01); *H04L 51/046* (2013.01); *H04L 51/10* (2013.01); *H04L 51/52* (2022.05); *H04L 67/06* (2013.01)

(56) References Cited

U.S. PATENT DOCUMENTS

| | | |
|---|---|---|
| 8,577,049 B2 | 11/2013 | Guntin et al. |
| 9,266,017 B1* | 2/2016 | Parker .................. A63F 13/355 |
| 9,744,452 B2 | 8/2017 | Miura et al. |
| 10,713,543 B1 | 7/2020 | Skuin et al. |
| 2004/0143852 A1 | 7/2004 | Meyers et al. |
| 2004/0224765 A1 | 11/2004 | Martinez et al. |
| 2006/0035692 A1 | 2/2006 | Kirby et al. |
| 2007/0047517 A1 | 3/2007 | Xu et al. |
| 2007/0111774 A1 | 5/2007 | Okada |
| 2007/0157173 A1 | 7/2007 | Klein et al. |
| 2007/0185909 A1 | 8/2007 | Klein et al. |
| 2007/0260687 A1 | 11/2007 | Rao et al. |
| 2008/0004117 A1 | 1/2008 | Stamper et al. |
| 2009/0106670 A1 | 4/2009 | Berndt et al. |
| 2009/0131177 A1* | 5/2009 | Pearce .................. A63F 13/12 463/43 |
| 2009/0296959 A1 | 12/2009 | Bongiovi et al. |
| 2009/0318224 A1 | 12/2009 | Ealey |
| 2010/0056280 A1 | 3/2010 | Langan et al. |
| 2011/0009192 A1 | 1/2011 | Aronzon et al. |
| 2011/0065503 A1 | 3/2011 | Wolff-Petersen et al. |
| 2013/0288759 A1* | 10/2013 | Rom ..................... A63F 13/537 463/7 |
| 2014/0128156 A1 | 5/2014 | Morioka |
| 2014/0143687 A1* | 5/2014 | Tan ....................... G06F 3/0481 715/757 |
| 2014/0228112 A1* | 8/2014 | Laakkonen ........... A63F 13/497 463/31 |
| 2015/0058709 A1* | 2/2015 | Zaletel .................. H04L 65/604 715/202 |
| 2015/0121230 A1 | 4/2015 | Kulavik et al. |
| 2015/0131845 A1 | 5/2015 | Forouhar et al. |
| 2016/0001183 A1 | 1/2016 | Harvey et al. |
| 2016/0099901 A1* | 4/2016 | Allen ................... G06F 3/04883 709/206 |
| 2017/0113136 A1* | 4/2017 | Marr .................... H04L 65/1089 |
| 2017/0113143 A1* | 4/2017 | Marr ..................... A63F 13/497 |
| 2017/0257414 A1* | 9/2017 | Zaletel .................. G06F 16/252 |
| 2017/0282073 A1* | 10/2017 | Kurabayashi ...... G06Q 30/0205 |
| 2018/0032858 A1 | 2/2018 | Lucey et al. |
| 2018/0351895 A1* | 12/2018 | Rathod .................... G06F 9/54 |
| 2019/0019036 A1* | 1/2019 | Yoo ....................... G06N 3/0445 |
| 2019/0224570 A1 | 7/2019 | Wolff-petersen et al. |
| 2019/0262724 A1* | 8/2019 | Trombetta .............. A63F 13/86 |
| 2019/0270020 A1* | 9/2019 | Miura ..................... A63F 13/86 |
| 2019/0366189 A1 | 12/2019 | Plant et al. |
| 2020/0037090 A1 | 1/2020 | Hackl |
| 2020/0188784 A1 | 6/2020 | Woidan et al. |
| 2020/0269136 A1 | 8/2020 | Gurumurthy et al. |
| 2020/0368616 A1 | 11/2020 | Delamont |
| 2020/0387817 A1 | 12/2020 | Kurtz et al. |
| 2020/0406139 A1 | 12/2020 | Chino |
| 2021/0031106 A1 | 2/2021 | Aiderman et al. |
| 2022/0143500 A1 | 5/2022 | Mahlmeister et al. |
| 2022/0152492 A1 | 5/2022 | Woidan et al. |

\* cited by examiner

1511

US 11,484,789 B2

METHODS, SYSTEMS, AND DEVICES OF SOCIAL NETWORKING WITH PORTIONS OF RECORDED GAME CONTENT

CROSS-REFERENCE TO RELATED APPLICATION(S)

The present application claims the benefit of priority to U.S. Provisional Application No. 62/758,069 filed Nov. 9, 2018, all sections of which are hereby incorporated herein by reference in their entirety.

FIELD OF THE DISCLOSURE

The present disclosure relates generally to methods, systems, and devices of social networking with portions of recorded game content.

BACKGROUND

It is common today for gamers to utilize more than one gaming accessory. This is especially true of gamers who play on-line games or competitive games in a team or individual configuration. Gamers can have at their disposal accessories such as a keyboard, a general-purpose gaming pad, a mouse, a gaming console controller, a headset to communicate with other players, a joystick, a computer console, or other common gaming accessories.

A gamer can frequently use a combination of these accessories in a single game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to other users.

In addition, a player can play a video game with other players (as teammates) and against opponents, all of which are remotely connected over a communication network. Further, the video game can monitor aspects of player interaction within the video game such that they can be reviewed to improve player performance in the future.

BRIEF DESCRIPTION OF THE DRAWINGS

Reference will now be made to the accompanying drawings, which are not necessarily drawn to scale, and wherein.

DETAILED DESCRIPTION

Figure 1:
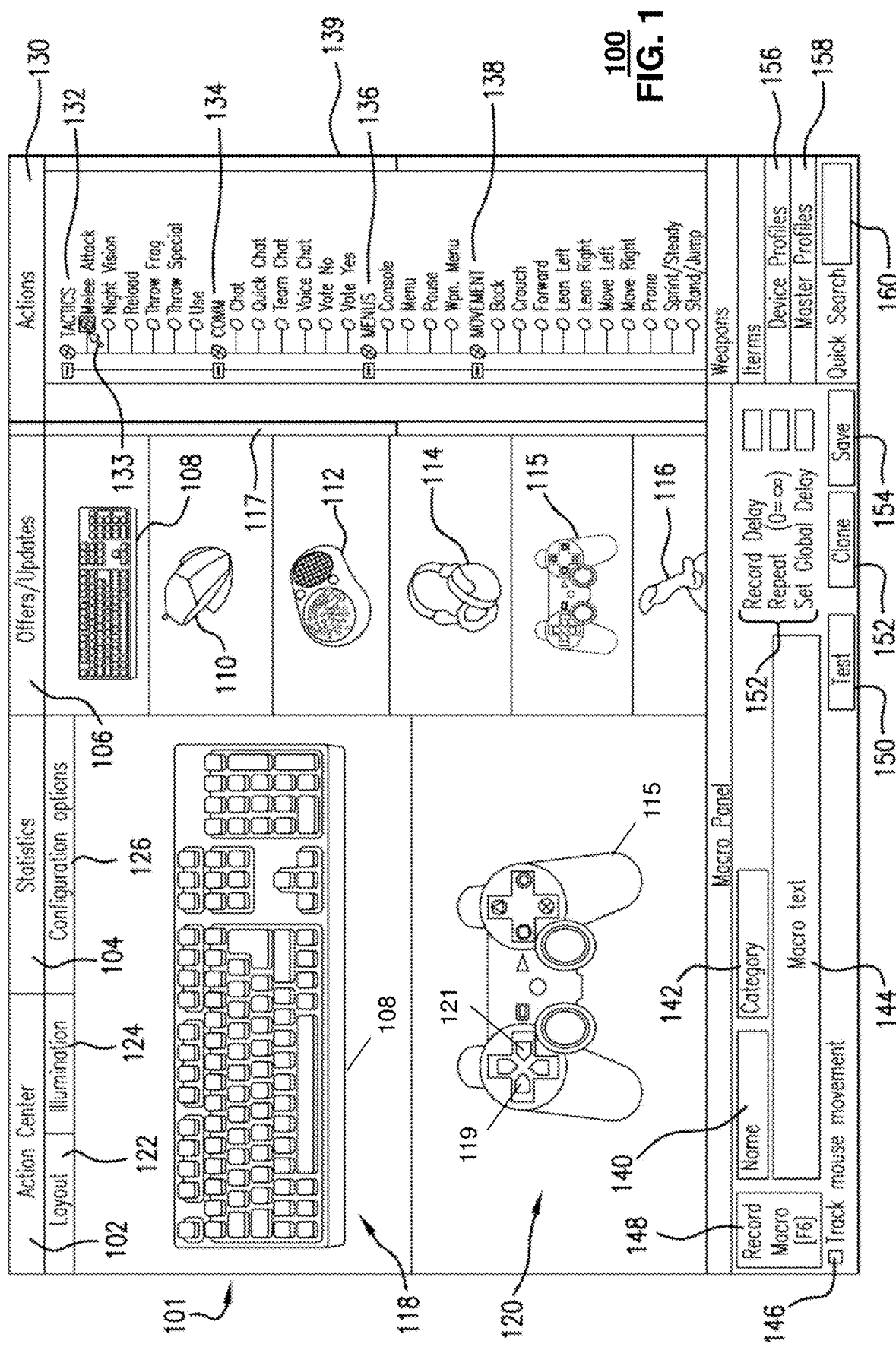
FIG. 1 depicts an illustrative embodiment of a Graphical User Interface (GUI) generated by an Accessory Management Software (AMS) application according to the present disclosure.

The subject disclosure describes, among other things, illustrative embodiments for detecting a current trigger during a video game and determining a group of players involved in the current trigger. Further embodiments include recording a trigger clip of game content for each player in the group of players resulting in a group of trigger clips. Each trigger clip of the group of trigger clips is a portion of game content that includes the current trigger from a perspective of each player of the group of players. Additional embodiments include detecting a request from a player to share a trigger clip of a game, preparing the trigger clip for sharing and sharing the trigger clip in a message to a third party or to a social media destination. Additional embodiments include storing one or more trigger clips in a library where the trigger clips are available for searching and review by players and others. Other embodiments are described in the subject disclosure.

On embodiment of the present disclosure can include a device. The device may include a memory to store instructions and a processor coupled to the memory. Responsive to executing the instructions, the processor performs operations. The operations may include detecting, by the processor, a request to share a trigger clip of a game and retrieving, by the processor, a trigger clip according to the detecting the request The trigger clip comprises a portion of game content that includes a stored trigger from a perspective of one or more players of a group of players of the game. The operations may further include preparing, by the processor, the trigger clip for sharing according to the request and sharing, by the processor, the trigger clip according to the request. Sharing of the trigger clip may include providing the trigger clip to one or more user devices over a communications network, wherein each user device of the one or more user devices is associated with a user who is not a player of the group of players.

Another embodiment of the present disclosure can include a method. The method may include receiving, by a processing system including a processor, one or more trigger clips. Each respective trigger clip comprises a respective portion of game content that includes a respective stored trigger from a perspective of one or more players of a group of players of a game. The method may further include storing, by the processing system, the one or more trigger clips in a library of trigger clips according to category information. The method may further include receiving, by the processing system, a request to share a trigger clip of the one or more trigger clips and retrieving, by the processing system, the trigger clip from the library. The method may further include sharing, by the processing system, the trigger clip according to the request, wherein the sharing the trigger clip comprises providing the trigger clip to one or more user devices over a communications network, wherein each user device of the one or more user devices is associated with a user who is not a player of the group of players of the game.

Another embodiment of the present disclosure can include a non-transitory machine-readable medium. The computer readable medium may include executable instructions that, when executed by a processing system including a processor, facilitate performance of operations. The operations may include storing one or more trigger clips in a library of trigger clips according to category information, wherein each respective trigger clip comprises a respective portion of game content from a perspective of one or more players of a group of players of a game. The operations may further include receiving a request to share a trigger clip of the one or more trigger clips, formatting, responsive to the request to share, a message including the trigger clip, and communicating the message over a communication network to a social networking destination.

FIG. 1 depicts an illustrative embodiment of a Graphical User Interface (GUI) generated by an Accessory Management Software (AMS) application according to the present disclosure. The AMS application can be executed by a computing device such as a desktop computer, a laptop computer, a tablet, a server, a mainframe computer, a gaming console, a gaming accessory, or any combination or portions thereof. The AMS application can also be executed by portable computing devices such as a cellular phone, a personal digital assistant, or a media player. The AMS application can be executed by any device with suitable computing and communication resources.

Figure 2:
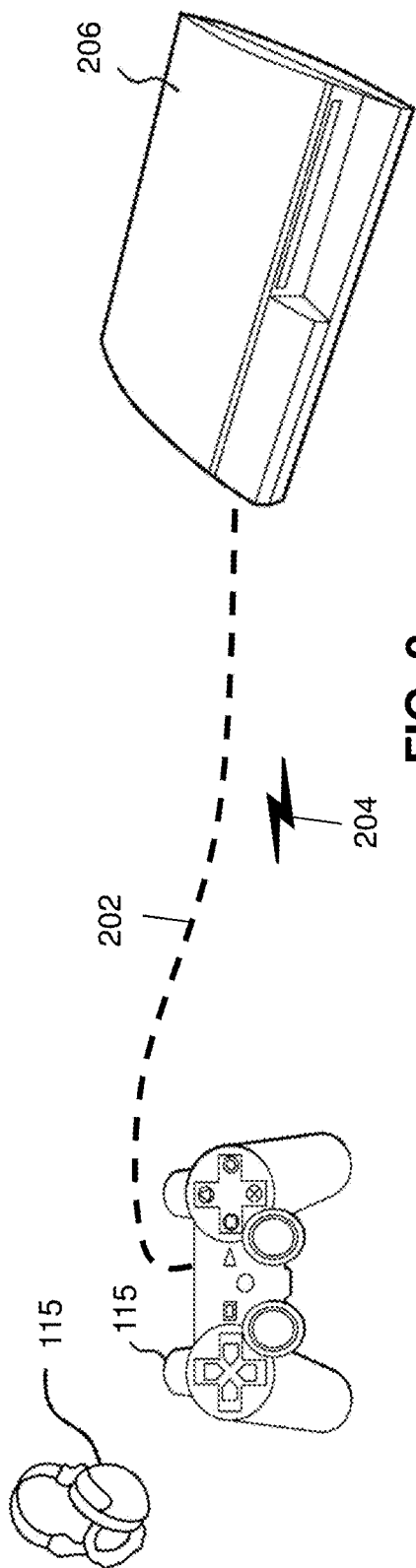
FIGS. 2-3 depict illustrative embodiments for communicatively coupling a gaming controller to a computing device.

FIG. 2 illustrates several embodiments for utilizing a gaming controller 115 with a computing device 206 in the form of a gaming console. In the illustration of FIG. 2, the gaming controller 115 can be communicatively coupled to the gaming console 206 with a tethered cable interface 202 such as a USB or proprietary cable, or a wireless interface 204 such as WiFi, Bluetooth, ZigBee, or a proprietary wireless communications protocol. The cable interface 202 provides a means for communication that may be less susceptible to electromagnetic interference. It will be appreciated that the gaming controller 115 may further include a headset 114 (with or without a microphone not shown) utilized by a gamer to communicate with teammates and/or to listen to game sounds in high fidelity. In the illustration of FIG. 2, the AMS application can in whole or in part be executed by the gaming controller 115, the gaming console 206, or a combination thereof.

Figure 3:
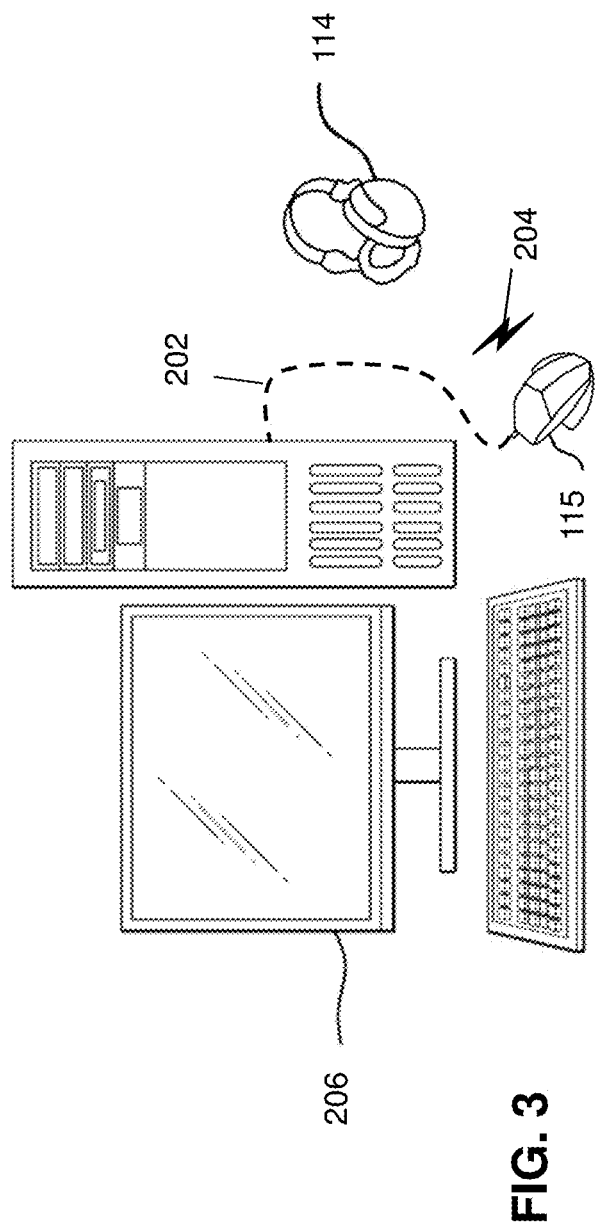

FIG. 3 illustrates several other embodiments for utilizing a gaming controller 115 with a computing device 206. In this embodiment, the gaming controller 115 comprises a mouse and the computing device 206 comprises a computer. The gaming controller 115 can be tethered to the computing device 206 by a cable interface 202 (e.g., USB cable or proprietary cable) or a wireless interface 204. The cable interface 202 provides a means for communication that may be less susceptible to electromagnetic interference. It will be appreciated that the gaming controller 115 may further include a headset (with or without a microphone not shown) utilized by a gamer to communicate with teammates and/or to listen to game sounds in high fidelity. In the illustration of FIG. 3, the AMS application can in whole or in part be executed by the gaming controller 115, the gaming console 206, or a combination thereof.

For illustration purposes, the terms gaming console 206 and computer 206 will be used hence forth interchangeably with the term computing device 206 with an understanding that a computing device 206 may represent a number of other devices such as a server, a tablet, a smart phone, and so on. Accordingly, a computing device 206 can represent any device with suitable computing resources to perform the methods described in the subject disclosure.

Figure 4:
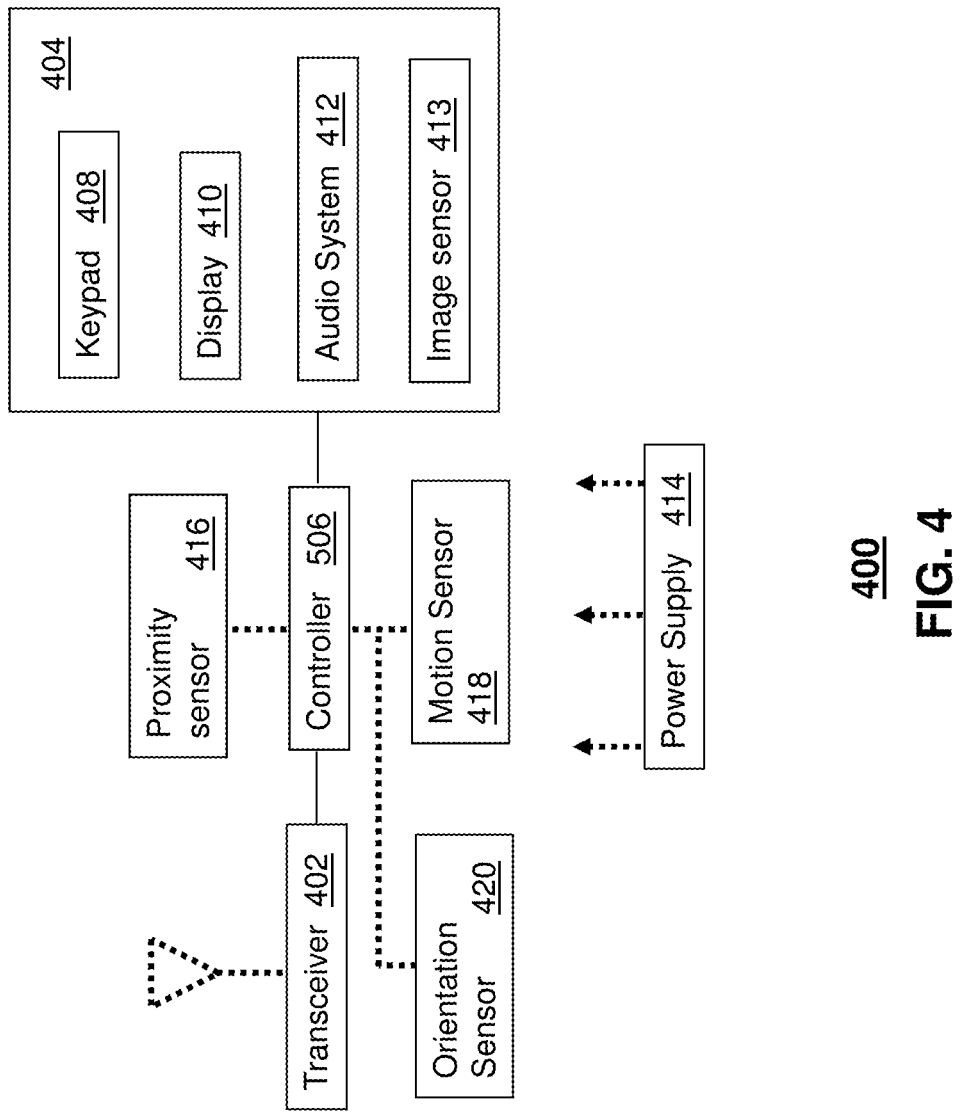
FIG. 4 depicts an illustrative embodiment of a communication device.
Figure 5:
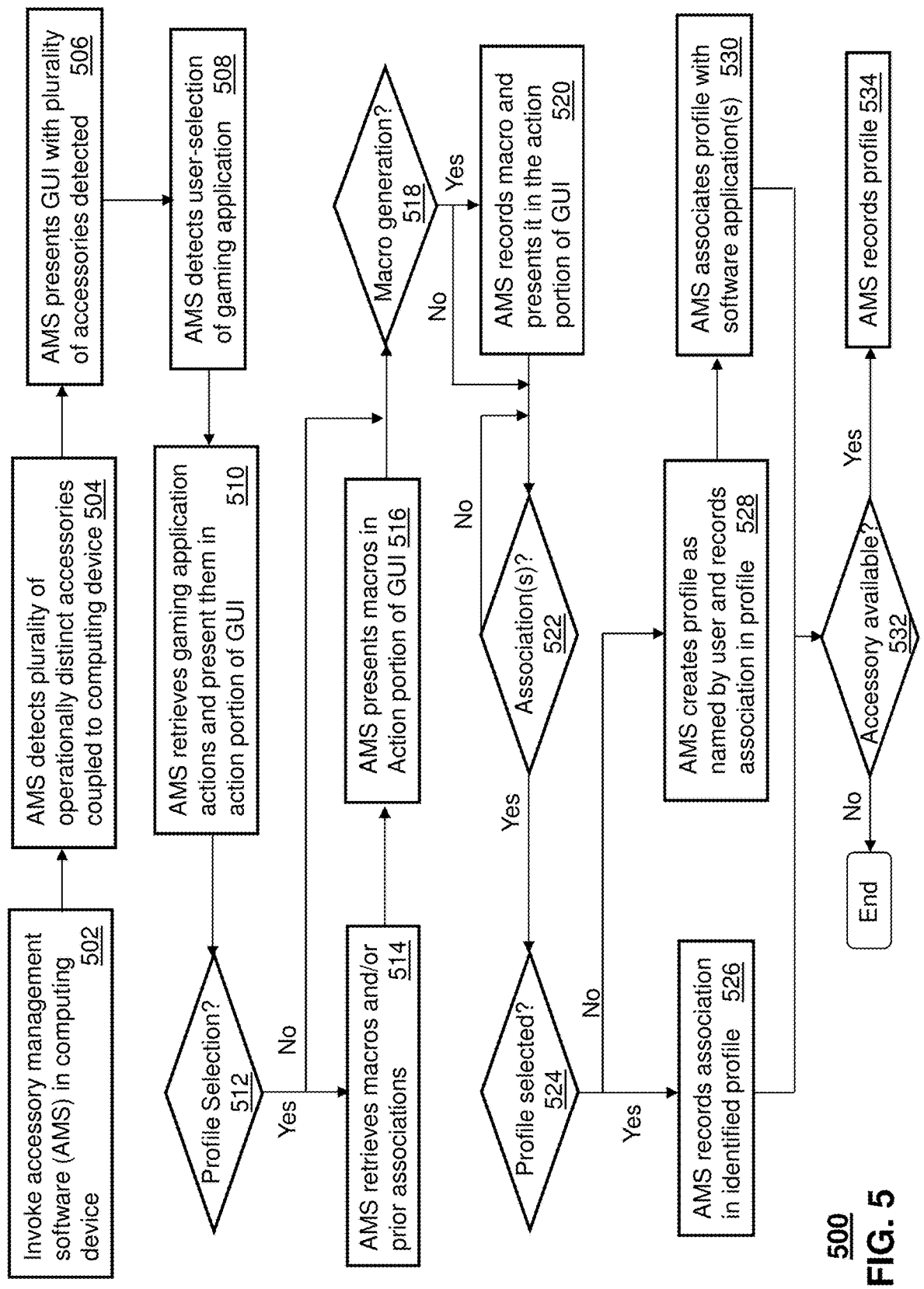
FIG. 5 depicts an illustrative embodiment of a first method utilized in the subject disclosure.

FIG. 4 depicts an illustrative embodiment of a communication device 400. Communication device 400 can serve in whole or in part as an illustrative embodiment of devices described in the subject disclosure. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 utilizes touch-sensitive technology, a portion or all the keypad 408 can be presented by way of the display 410 with navigation features. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 as described herein can operate with components described in FIG. 4 to accommodate the implementation of devices described by the subject disclosure. These variant embodiments are contemplated by the subject disclosure.

FIGS. 5-7A depict methods 500-700 describing illustrative embodiments of the AMS application. Method 500 can begin with step 502 in which the AMS application is invoked in a computing device. The computing device can be a remote server (not shown), the gaming console 206 or computer 206 of FIGS. 2-3, or any other computing device with suitable computing resources. The invocation step can result from a user selection of the AMS application from a menu or iconic symbol presented by the computing device 206, or when a user communicatively couples a gaming controller 115 or other form of accessory device with the computing device 206. In step 504, the AMS application can detect by way of software drivers in an operating system (OS) of the computing device 206 a plurality of operationally distinct accessories communicatively coupled to the computing device 206. The accessories can be coupled to the computing device 206 by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device 206 (or which can be an integral part of the computing device) and which can control aspects of the OS and/or a software application operating from the computing device 206. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 depicting operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a software application such as a video game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of an accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the keyboard 108 can be associated with one of the buttons of the gaming controller 115 (e.g., the left button 119).

In one embodiment, a Melee Attack action can be associated by dragging this action to either the left button 119 or right button 120 of the gaming controller 115. Thus, when the selected button is depressed, the stimulus signal that is generated by the selected button of the gaming controller 115 can be substituted by the AMS application with the Melee Attack action. In another embodiment, the AMS application can be configured so that the Melee Action can be associated with a combination of key button presses (e.g., simultaneous depression of the left and right buttons 119, 121, or a sequence of button depressions: two rapid left button depressions followed by a right button depression).

In yet another embodiment, the AMS application can be configured so that the Melee Action can be associated with movement of the gaming controller 115 such as, for example, rapid movement or shaking of the gaming controller 115. In a further embodiment, the AMS application can be adapted to make associations with two dimensional or three-dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can monitor gaming venue states by analyzing captured images produced by the gaming application (e.g., one or more still images of a tank, or a video of an avatar entering a tank), and/or by receiving messages from the gaming application by way of an application programming interface (API) thereby enabling the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by the OS of the computing device 206, or any other recordable stimulus to initiate, control or manipulate software applications. For instance, a macro can represent a user entering the identity of a software application (e.g., instant messaging tool) to be initiated by the OS upon the AMS application detecting a speech command using speech recognition technology.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions with input functions of the keyboard 108 or the gaming controller 115. Associations can also be made based on the two- or three-dimensional movements of the gaming controller 115. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

Referring to step 526, once the associations have been recorded in a profile, the AMS application can determine in step 532 which of the accessories shown illustratively in FIGS. 1-3 are programmable and available for programming. If the AMS application detects that an accessory (e.g., keyboard 108, gaming controller 115) is communicatively coupled to the computing device 206 and determines that the accessory is capable of performing stimulus substitutions locally, the AMS application can proceed to step 534 of FIG. 5 where it submits the profile and its contents for storage in the accessory (e.g., the gaming controller 115 in FIGS. 2-3). Once the accessory (e.g., the gaming controller 115) is programmed with the profile, the accessory can perform stimuli substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can present a layout of the accessory (button 122), how the accessory is illuminated when associations between input functions and actions are made (button 124), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application as described in the subject disclosure. Selecting button 106 can also cause the AMS application to adapt the GUI 101 to present promotional offers and software updates.

The steps of method 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 500 or variants thereof. These undisclosed approaches are contemplated by the subject disclosure.

Figure 6:
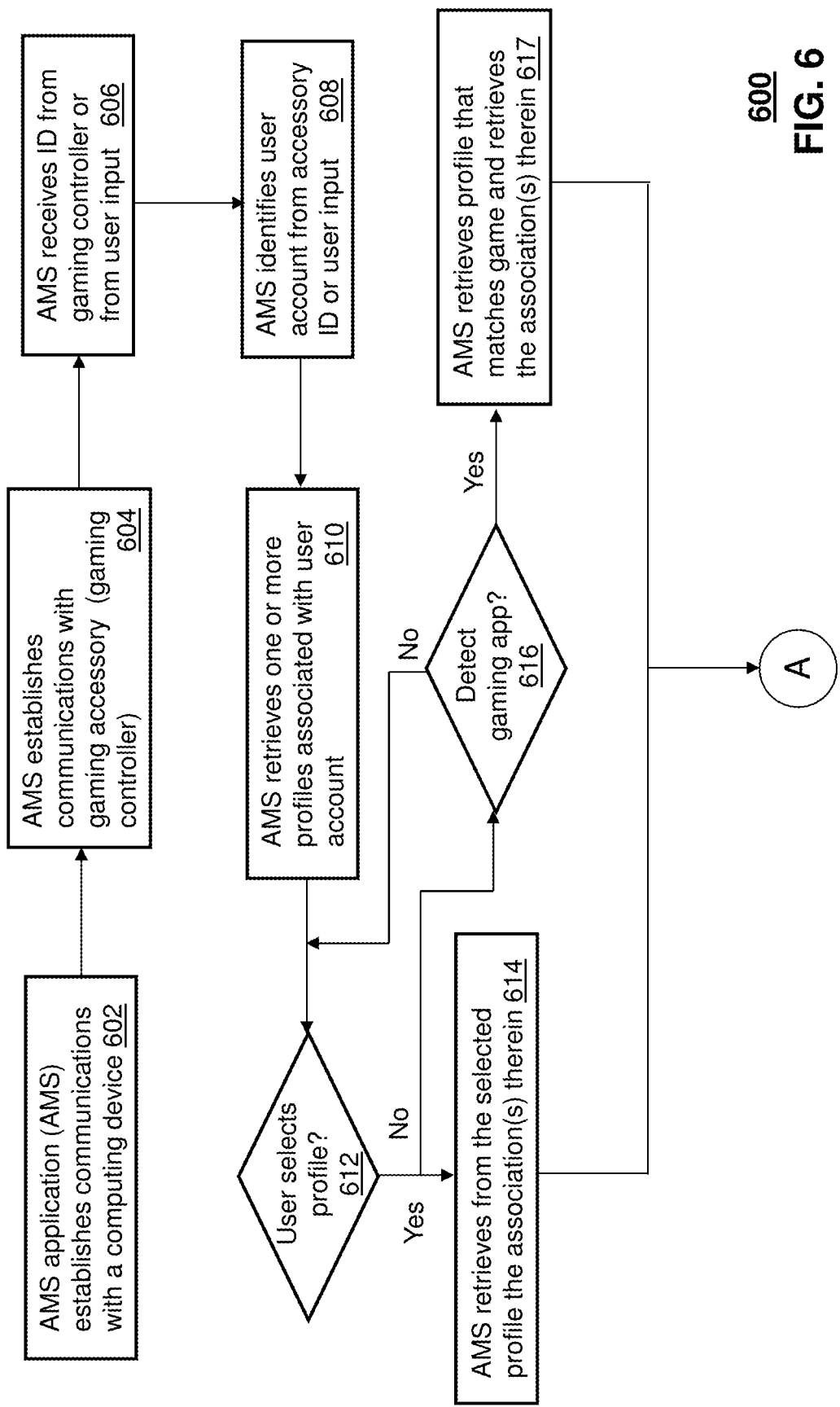
FIG. 6 depicts an illustrative embodiment of a second method utilized in the subject disclosure.

FIG. 6 depicts a method 600 for illustrating additional operations of the AMS application. In the configurations of FIGS. 2-3, the AMS application can be operating in whole or in part from the gaming controller 115, a gaming console 206, a computer 206, or a remote server (not shown). For illustration purposes, it is assumed the AMS application operates from the gaming console 206. Method 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user selects, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other suitable associations that result in substitute stimulations. The accessory stimulations can be stimulations that are generated by the gaming controller 115, as well as stimulations from other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three-dimensional lift of the mouse can cause the tank to steer according to the three-dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three-dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again, the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state and can perform substitutions of stimuli generated by the gaming controller 115, and/or speech commands received by microphone of the headset 114.

In one embodiment, the AMS application can be configured in step 719 to retrieve a profile that provides substitute stimuli for replacing certain stimuli generated by accessories. The associations recorded in the profile can be venue independent. In another embodiment, the AMS application can retrieve a combination of profiles, where one or more profiles provide substitute stimuli that are venue dependent and one or more other profiles provide substitute stimuli that are venue independent.

The AMS application can monitor in step 720 stimulations generated by the accessories coupled to the gaming console 206. The stimulations can be generated by the gamer by manipulating the gaming controller 115, and/or by generating speech commands detected by a microphone of the headset 114. If a stimulation is detected at step 720, the AMS application can determine in step 722 whether to forward the detected stimulation(s) to an Operating System (OS) of the gaming console 206 or the gaming application directly without substitutions. This determination can be made by comparing the detected stimulation(s) to corresponding associations in one or more profiles retrieved by the AMS application. If the detected stimulation(s) match the associations, then the AMS application proceeds to step 740 where it retrieves substitute stimulation(s) in the profile(s). In step 742, the AMS application can substitute the detected stimulation(s) with the substitute stimulations in the profile(s).

In one embodiment, the AMS application can track in step 744 the substitute stimulations by updating the stimulations with a unique identifier such as a globally unique identifier (GUID). In this embodiment, the AMS application can also add a time stamp to each substitute stimulation to track when the substitution was performed. In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Referring to step 722, if the detected stimulation(s) do not match an association in the profile(s), then the AMS application proceeds to one of steps 744 or 746 in order to track the stimulations of the accessory as described above. In another embodiment, tracking of original stimulations or substitute stimulations can be bypassed by skipping steps 744 or 746 and proceeding to step 770 of FIG. 7B.

Figure 7A:
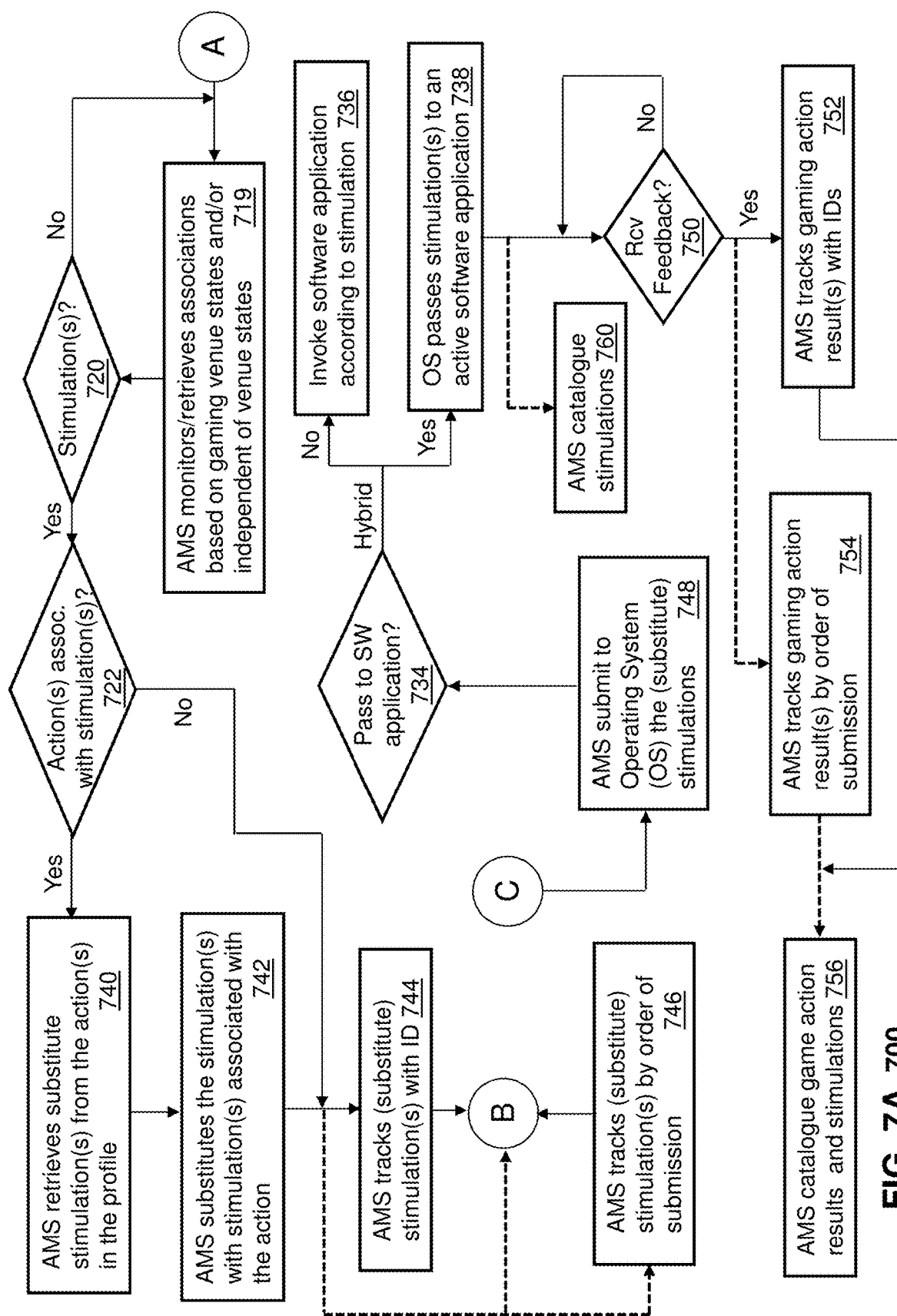
FIG. 7A depicts an illustrative embodiment of a third method utilized in the subject disclosure.
Figure 7B:
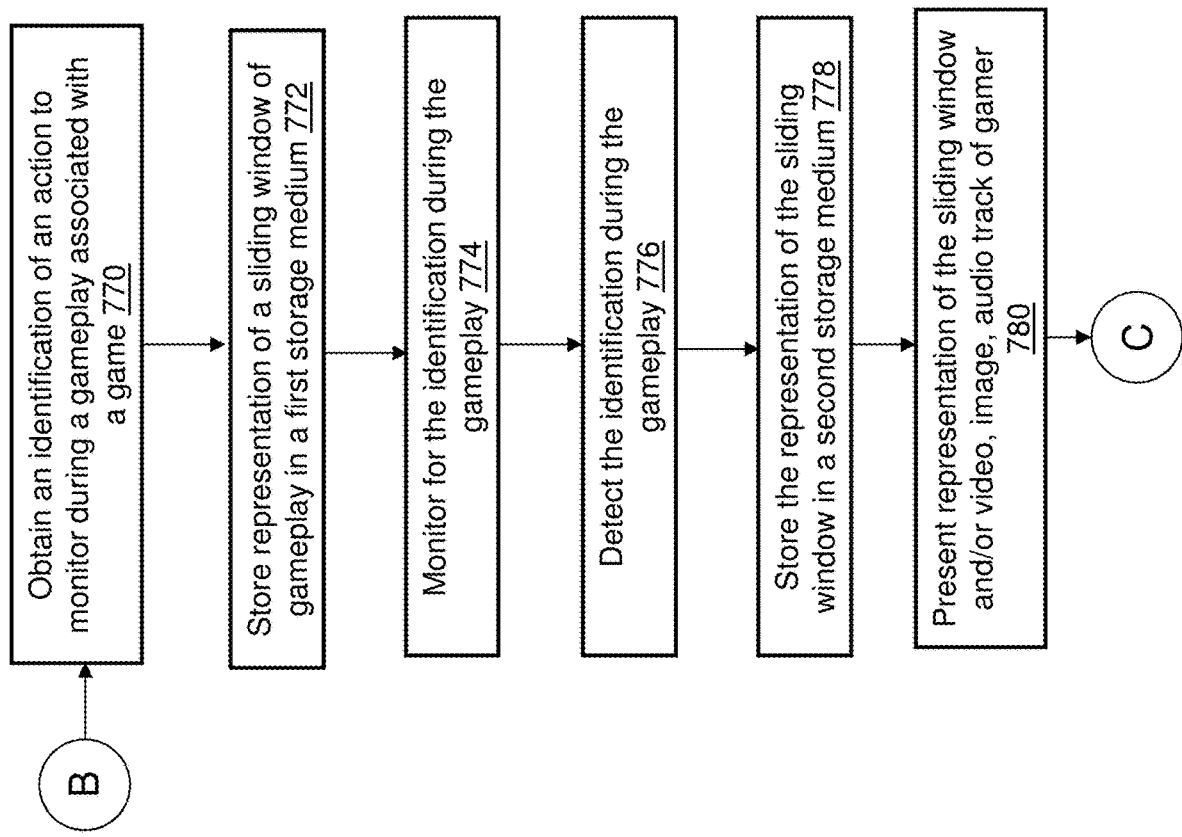
FIG. 7B depicts an illustrative embodiment of a fourth method utilized in the subject disclosure.

Once the stimulations received in step 720 have been substituted with other stimulations at step 742 responsive to a detected association, or maintained unchanged responsive to detecting no association with substitute stimuli, and (optionally) the AMS application has chosen a proper tracking methodology for correlating gaming action results with stimulations, the AMS application can proceed to step 770 of FIG. 7B.

Referring to FIG. 7B, at step 770, the AMS application can obtain an identification of an action to monitor during a gameplay associated with a game. The identification of the action may include a specification of a sound volume level associated with a user (e.g., a gamer). The identification of the action may include a specification of several user inputs exceeding a threshold. The number of user inputs may include several messages that are submitted, an identification of a content of the messages, an identification of an emoji, or a combination thereof. The identification of an action may include a gaming action provided by the game—see FIGS. 8-9 and accompanying descriptions.

Figure 12:
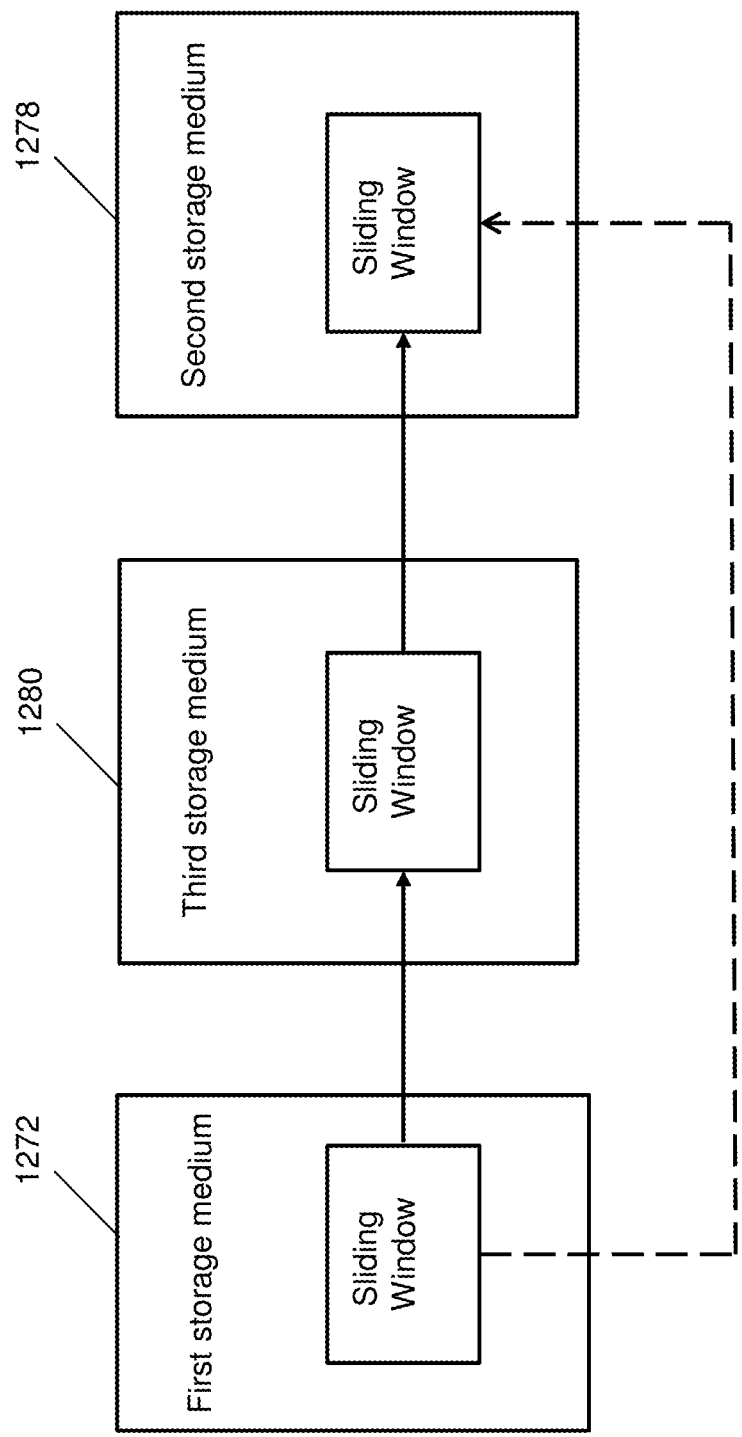
FIG. 12 depicts the storage media for storing a representation of a sliding window in accordance with aspects of this disclosure.

At step 772, the AMS application can store a representation of a sliding window of the gameplay in a first storage medium (e.g., first storage medium 1272 of FIG. 12). The storage of step 772 may occur in real-time during the gameplay. The representation of the sliding window of the gameplay may include a video, an image, an audio track, or a combination thereof. The first storage medium may include a buffer of a graphics card, a random access memory, or a combination thereof.

Figure 11:
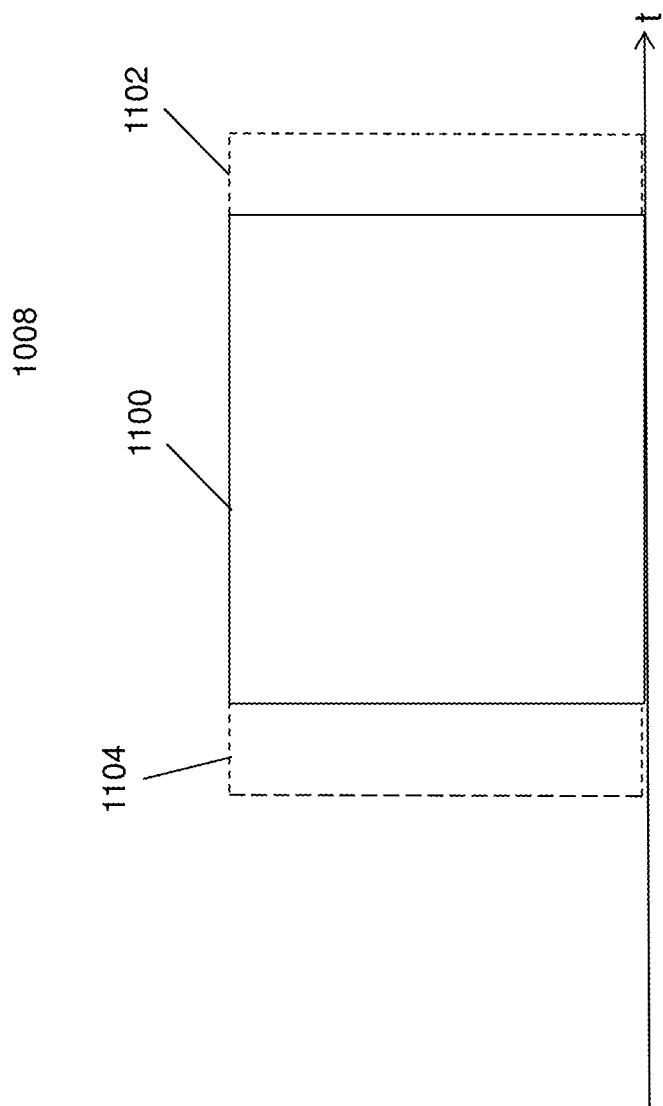
FIG. 11 depicts an illustrative diagrammatic representation of a sliding window in accordance with aspects of this disclosure.

The sliding window may be of a substantially fixed duration, such that the sliding window progresses as the user/gamer continues to play a game. For example, and briefly referring to FIG. 11, a sliding window 1100 (as a function of time t) is shown. As gameplay progresses, a new/supplemental representation of the gameplay may be added as shown via reference character/dashed portion 1102. In order to accommodate storage of the portion 1102, another portion 1104 may be deleted/overwritten. In the embodiment shown in FIG. 11, the portion 1104 to be deleted/overwritten corresponds to the oldest/earliest-in-time portion of the window 1100. In some embodiments, a portion other than, or in addition to, the oldest portion may be identified for being deleted/overwritten. Still further, in some embodiments the sliding window 1100 may be of a variable duration. For example, the duration/length of the sliding window may be a function of network traffic, a capability of a device (e.g., storage capacity), user/gamer inputs, etc.

Referring to FIG. 7B, at step 774, the AMS application can monitor for the identification of the action during the gameplay.

At step 776, the AMS application can detect the identification during the gameplay responsive to the monitoring. In some embodiments, whether an event has occurred or not, as reflected by the detection of step 776, may be based on a comparison of game action with one or more thresholds. Such thresholds may be specified by users/gamers (e.g., in accordance with user inputs/preferences), may be predetermined based on one or more rules/configurations associated with a game, etc.

At step 778, the AMS application can store at least a portion of the representation of the sliding window of the gameplay in a second storage medium (e.g., second storage medium 1278 of FIG. 12). The second storage medium may be the same as, or different from, the first storage medium. The second storage medium may include a server associated with a social media platform, a server associated with a virtual machine, a memory contained within a common housing as the first storage medium, a network element (e.g., a router, a gateway, a switch, etc.), or a combination thereof.

The storing of step 778 may include storing a video of a gamer, an image of the gamer (e.g., a thumbnail or icon representation of the gamer), an audio track of the gamer, or a combination thereof.

The storing of step 778 may include presenting a prompt (potentially responsive to the monitoring of step 774), placing a copy of the representation of the sliding window of the gameplay in a third storage medium (e.g., third storage medium 1280 of FIG. 12, which may be different from the first storage medium (1272) and/or the second storage medium (1278)), receiving a user input in response to the prompt, and storing the copy in the second storage medium responsive to the user input.

The placement of the representation/copy of the sliding window of the gameplay in the third storage medium may free/alleviate the first storage medium, such that the first storage medium can continue capturing gameplay/action as the gameplay continues subsequent to the detection of step 776. Also, the placement of the representation/copy of the sliding window of the gameplay in the third storage medium may free the user/gamer of not having to commit to placing the representation/copy of the sliding window of the gameplay into more permanent storage (e.g., the second storage medium). For example, placement in the third storage medium may facilitate editing or review operations of the representation/copy of the sliding window prior to uploading the same to the second storage medium.

In some embodiments, the placing of the copy of the representation of the sliding window of the gameplay in the third storage medium may include initiating a timer to store a second sliding window of the representation after detecting the action, thereby resulting in an updated representation of the sliding window of the gameplay. Responsive to detecting an expiration of the timer, the updated representation may be stored in the third storage medium. A length of the timer may be based on a user input.

In some embodiments, the storing of step 778 may include storing a new representation of the sliding window of the gameplay in the first storage medium during the gameplay after placing the copy in the third storage medium; in some embodiments, the storage of the new representation may coincide with a step that is separate from step 778.

At step 780, the AMS application may present (e.g., simultaneously present) the representation of the sliding window and/or the video, image, and/or audio track of the gamer, or a combination thereof. In some embodiments, a user/gamer may generate media that may be shared on one or more platforms (e.g., social media platforms) as a game is occurring, where the media may include the representation of the sliding window and/or the video, image, and/or audio track of the gamer, or a combination thereof. Alternatively, the user/gamer may generate the media following the conclusion of the game in order to avoid distractions during the game.

One or more of the steps shown in conjunction with FIG. 7B may be executed more than once. For example, subsequent to storing the representation of the sliding window of the gameplay in the second storage medium as part of step 778, a second representation of the sliding window of the gameplay may be stored in the first storage medium (as part of a second execution of step 772). The storing of the second representation of the sliding window of the gameplay may overwrite at least a portion of the representation of the sliding window of the gameplay in the first storage medium as described above.

Figure 7C:
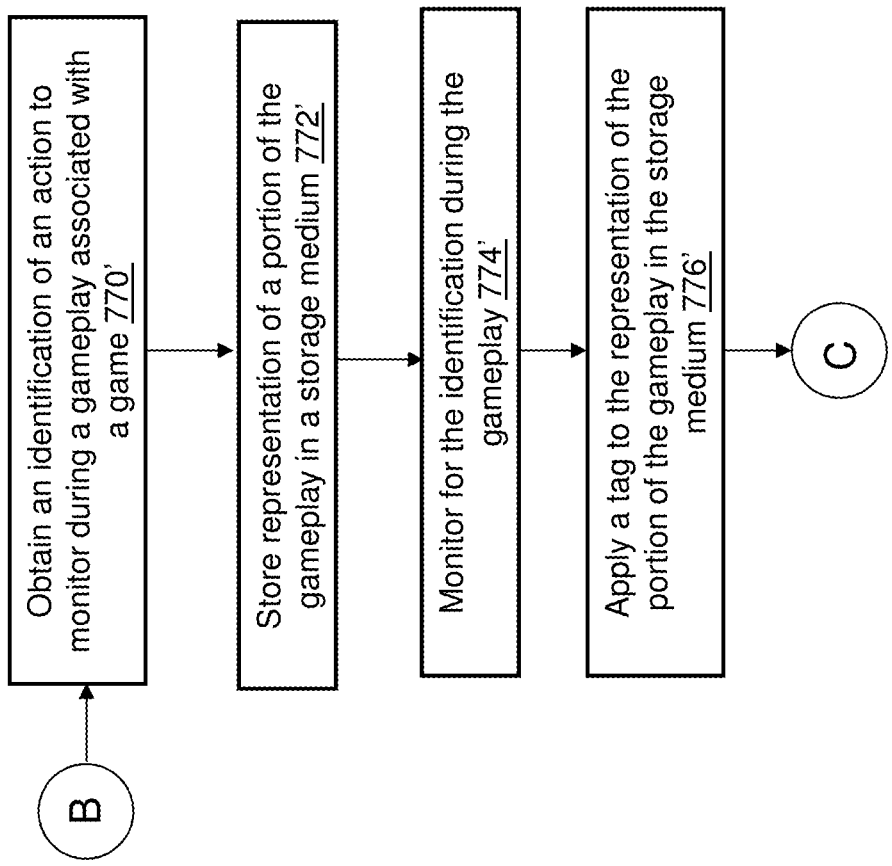
FIG. 7C depicts an illustrative embodiment of a fifth method utilized in the subject disclosure.

FIG. 7C illustrates another embodiment of a method that may be executed in conjunction with the flow shown in FIG. 7A. As shown in FIG. 7C, in step 770' the AMS application can obtain an identification of an action to monitor during a gameplay associated with a game. The identification of the action may include a specification of several actions per unit time.

In step 772', the AMS application can store a representation of a portion of the gameplay in a storage medium.

In step 774', the AMS application can monitor the gameplay for the identification of the action.

In step 776', the AMS application can apply a tag to the representation of the portion of the gameplay in the storage medium responsive to the monitoring.

The representation of the portion of the gameplay may include a first video clip that occurs prior to an occurrence of the action and a second video clip that occurs subsequent to the action. A first time duration of the first video clip, a first resolution of the first video clip, a second time duration of the second video clip, and a second resolution of the second video clip may be based on one or more user preferences, network traffic, a device capability, etc.

The representation of the portion of the gameplay may include a video clip. The tag may include a watermark that is applied to the video clip. The watermark may include the identification of the action. The tag may include metadata that is associated with the video clip. The metadata may be searchable via a search engine. The metadata may include a selectable link that, when selected, causes a client device to obtain the video clip.

Figure 7D:
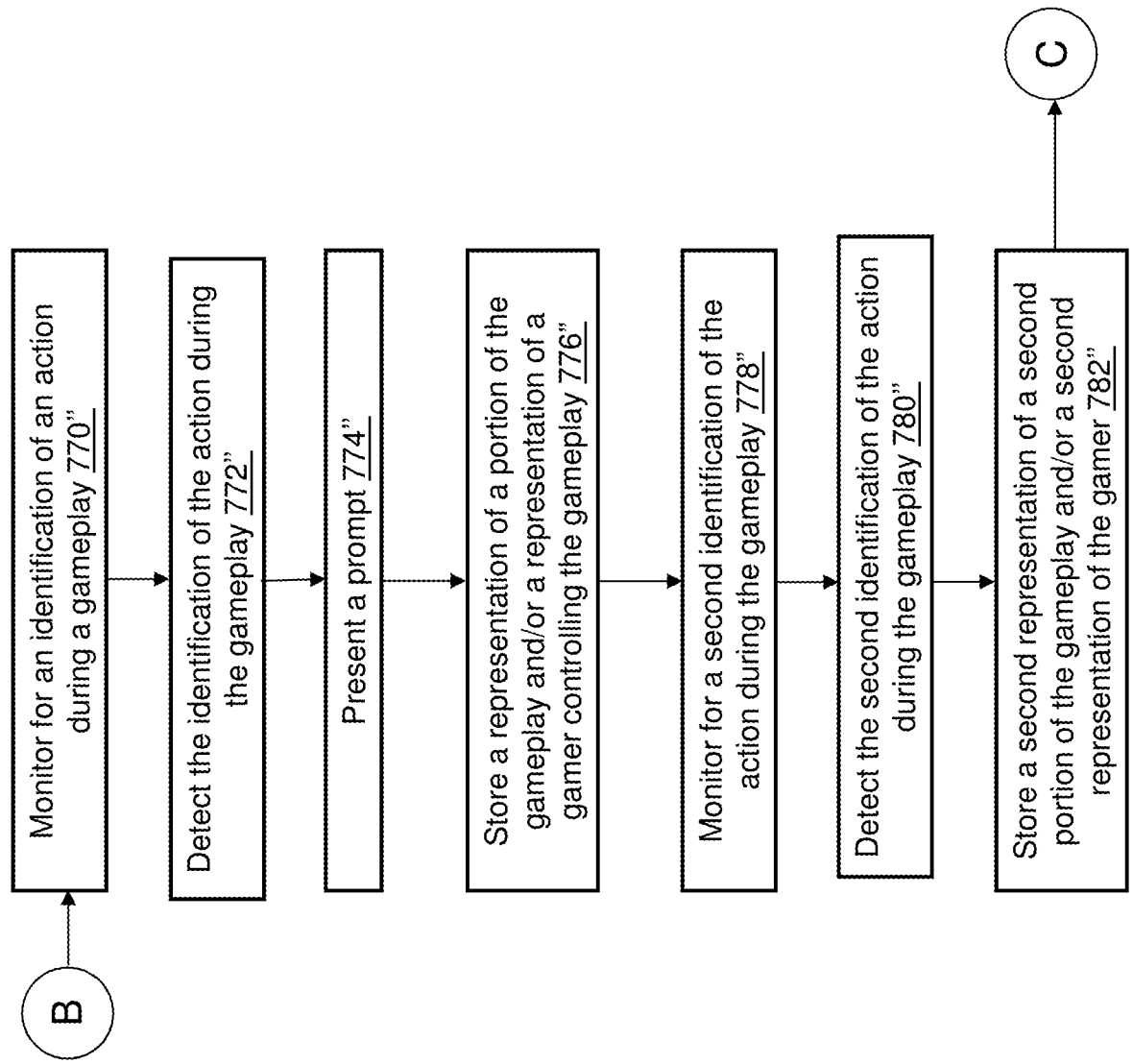
FIG. 7D depicts an illustrative embodiment of a sixth method utilized in the subject disclosure.

FIG. 7D illustrates another embodiment of a method that may be executed in conjunction with the flow shown in FIG. 7A. As shown in FIG. 7D, in step 770" the AMS application can monitor for an identification of an action during a gameplay.

In step 772", the AMS application can detect the identification of the action during the gameplay responsive to the monitoring.

In step 774", the AMS application can present a prompt responsive to the detecting.

In step 776", the AMS application can store a representation of a portion of the gameplay, a representation of a gamer controlling the gameplay, or a combination thereof, in a storage medium according to a user-generated input associated with the prompt.

In some embodiments, machine-learning/artificial intelligence may be applied to identify portions of a gameplay that are memorable or are of interest to a user (e.g., a gamer). For example, responsive to the user-generated input associated with the prompt in step 776", the AMS application can monitor for a second identification of the action (or an alternative action) in step 778".

In step 780", the AMS application can detect the second identification of the action (or the alternative action) during the gameplay responsive to the monitoring for the second identification.

In step 782", the AMS application can store a second representation of a second portion of the gameplay, a second representation of the gamer, or a combination thereof, in the storage medium without presenting a second prompt.

Once the AMS application at step 748 supplies to the OS of the computing device 206 a gaming action (i.e., one or more stimulations) from the method of FIG. 7B, the method of FIG. 7C, the method of FIG. 7D, or a combination thereof, the AMS application can proceed to step 734. The gaming action supplied to the OS at step 748 can be the unadulterated "original" gaming action of step 720, or an alternative gaming action generated by steps 744 or 746. At step 734, the OS determines whether to invoke in step 736 a software application identified in the stimulation(s) (e.g., gamer says "turn on team chat", which invokes a chat application), whether to forward the received stimulation(s) to the gaming software application in step 738, or combinations thereof.

Contemporaneous to the embodiments described above, the AMS application can monitor in step 750 for game action results supplied by the gaming application via API messages previously described. For instance, suppose the stimulation sent to the gaming application in step 738 is a command to shoot a pistol. The gaming application can determine that the shot fired resulted in a miss of a target or a hit. The gaming application can respond with a message which is submitted by way of the API to the AMS application that indicates the shot fired resulted in a miss or a hit. If IDs such as GUIDs were sent with each stimulation, the gaming application can submit game action results with their corresponding GUID to enable the AMS application to correlate the gaming action results with stimulations having the same GUID.

For example, if the command to shoot included the ID "1234", then the game action result indicating a miss will include the ID "1234", enabling the AMS application in step 752 to correlate the game action result to the stimulation having the same ID. If on other hand, the order of game action results can be maintained consistent with the order of the stimulations, then the AMS application can correlate in step 754 stimulations with game action results by the order in which stimulation were submitted and the order in which game action results are received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

Figure 7E:
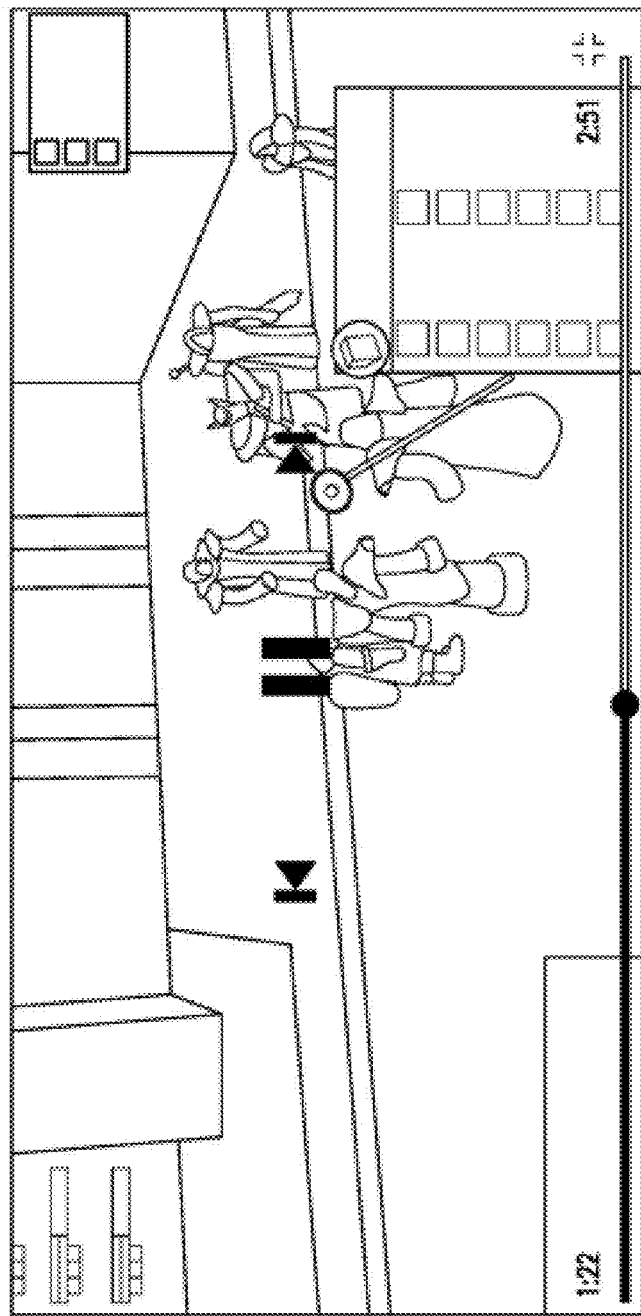
FIGS. 7E-7G depict illustrative embodiments of interfaces associated with a gameplay of a game.

FIG. 7E illustrates an interface that may be used to present at least a portion of a gameplay associated with a game. Various controls/commands, such as for example VCR types/styles of controls/commands, may be presented as a part of the interface to facilitate a recording or capture of one or more portions of the gameplay.

Figure 7F:
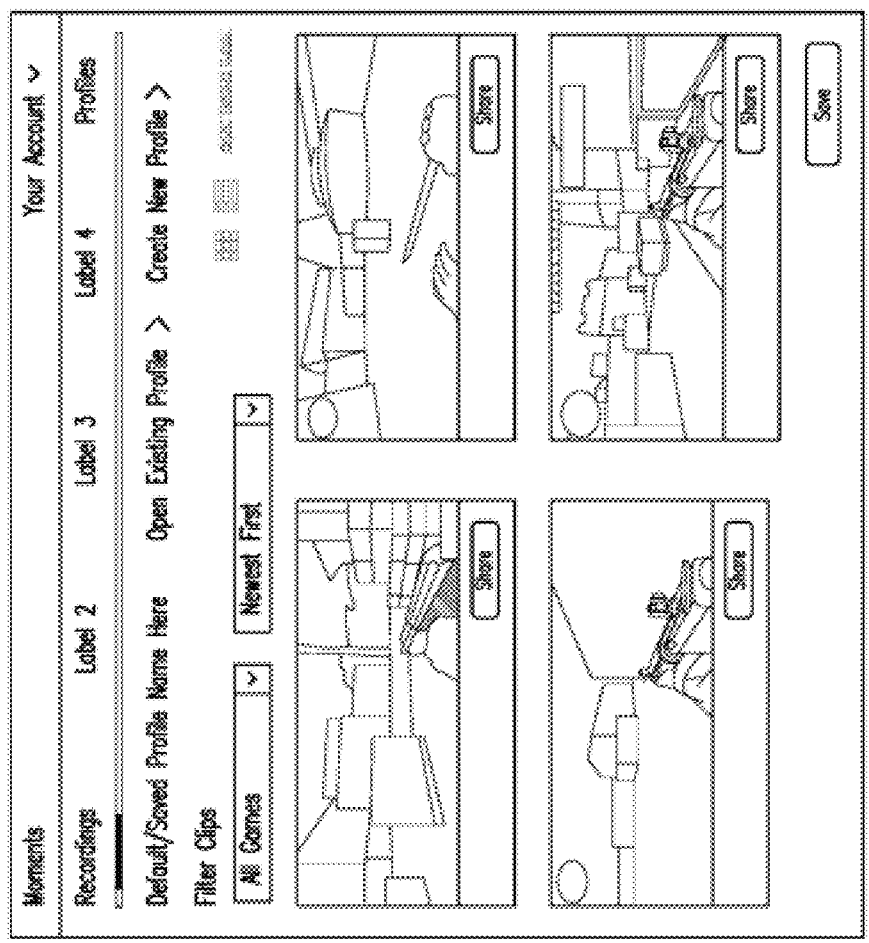

FIG. 7F illustrates an interface that may provide control over a recording or sharing of one or more representations (e.g., clips) of a gameplay associated with a game. Various controls, such as for example a "share" button or the like, may be provided to enable a user (e.g., a gamer) to post or otherwise share the representation(s). In some embodiments, editing controls may be provided to allow the user to customize the representation prior to, or subsequent to, sharing the representation.

In some embodiments, a user/gamer may have an ability to supplement the representation of the gameplay with commentary that describes, for example, what the user's thought process was during the captured/represented portion of the gameplay. In this respect, and if the user/gamer is viewed or otherwise characterized as an expert in the game, a sharing of the representation of the gameplay may serve as a tutorial for novice users.

Figure 7G:
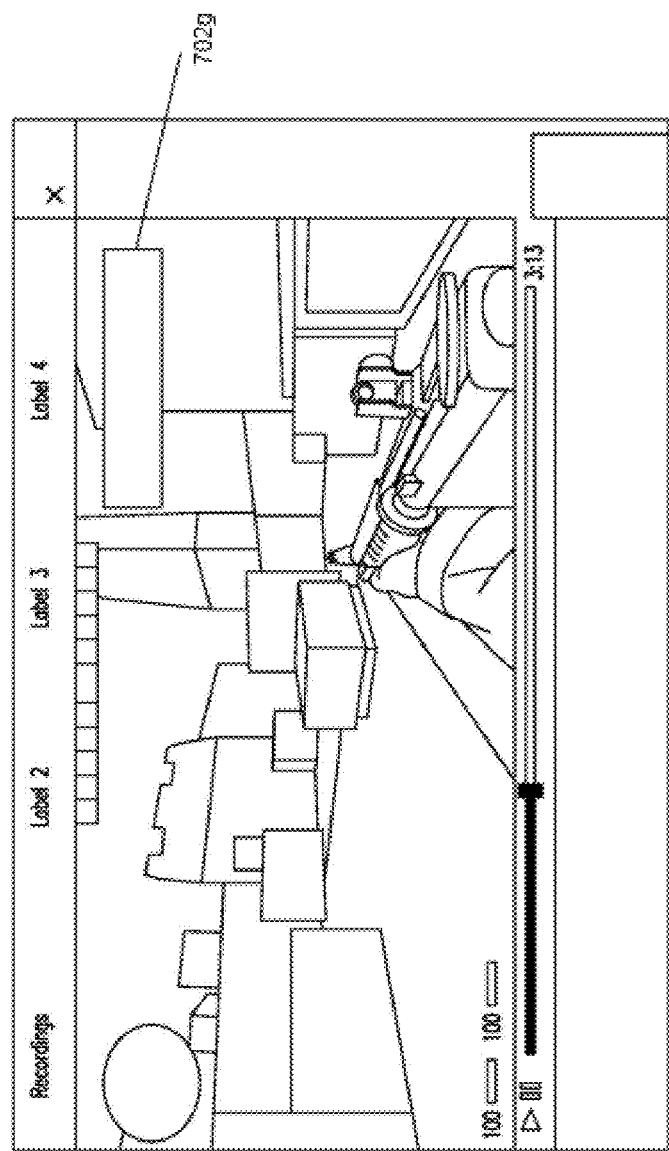

FIG. 7G illustrates an interface that may present a tag 702g (e.g., a watermark and/or metadata) associated with a representation of a gameplay. The tag 702g may include data acquired/obtained during the gameplay, such as for example a statement or other indication of results obtained by the gamer during the gameplay. Such a statement or other indication may be received via, e.g., a microphone, a keyboard, a mobile device, a computing/gaming console, etc.

The methods described herein (e.g., the methods described above in conjunction with FIGS. 7A-7D) may incorporate additional aspects. For example, in some embodiments a clip may be generated based on a user defined keybind (on a keyboard, mouse, or controller). Keybinds to trigger the clipping of a buffer to save to a local file system may be customized (e.g., may be based on user preferences). The gamer will be able to choose: the actual key to bind to the action, and the time slice to save (N seconds before and N' seconds after).

In some embodiments, clips may be auto-generated based on some event, such as for example a detected event, an audible input (e.g., screaming), messages associated with a chat client, etc. In some embodiments, default settings may be provided, and those settings may be at least partially overridden/replaced based on affirmative user inputs and/or based on artificial intelligence/machine-learned user preferences.

In some embodiments, one or more filtering techniques may be applied to remove content from a representation of a gameplay that is not of interest. Such filtering may be based on one or more user inputs/preferences, may be learned over time via machine learning/artificial intelligence, etc. If multiple events/actions that are being monitored for happen within a threshold amount of time (which may coincide with a buffer time), an event/action endpoint may be extended to create one long time slice/representation of the gameplay. Alternatively, separate representations may be generated in some embodiments.

In some embodiments, tagging (e.g., watermarking) may be overlaid on a representation (e.g., a video) of a gameplay. A watermark may have a given level of transparency associated with it to avoid obscuring/blocking the representation of the gameplay. One or more logos may be applied as part of the tagging. In some embodiments, a watermark may pulsate or otherwise fade in-and-out. In this respect, dynamic watermarks may be used. The use of a dynamic watermark may serve to draw additional additional/incremental attention to the watermark, which may be useful for promotional/marketing/branding purposes Aspects of sharing the representation of the gameplay may be controlled via one or more control parameters. Such control parameters may condition the sharing on a size of the representation (e.g., a video length), the content of the representation (e.g., controls may be present to limit a dissemination of the representation in view of intellectual property rights or other rights), etc. In some embodiments, a sharing of the representation of the gameplay may be limited to users that the gamer (or other entity) authorizes. For example, the sharing may be based on identifying a contact (e.g., a friend) of the gamer in one or more applications (e.g., a phone application, an email application, a text message application, a social media application, etc.).

Figure 8:
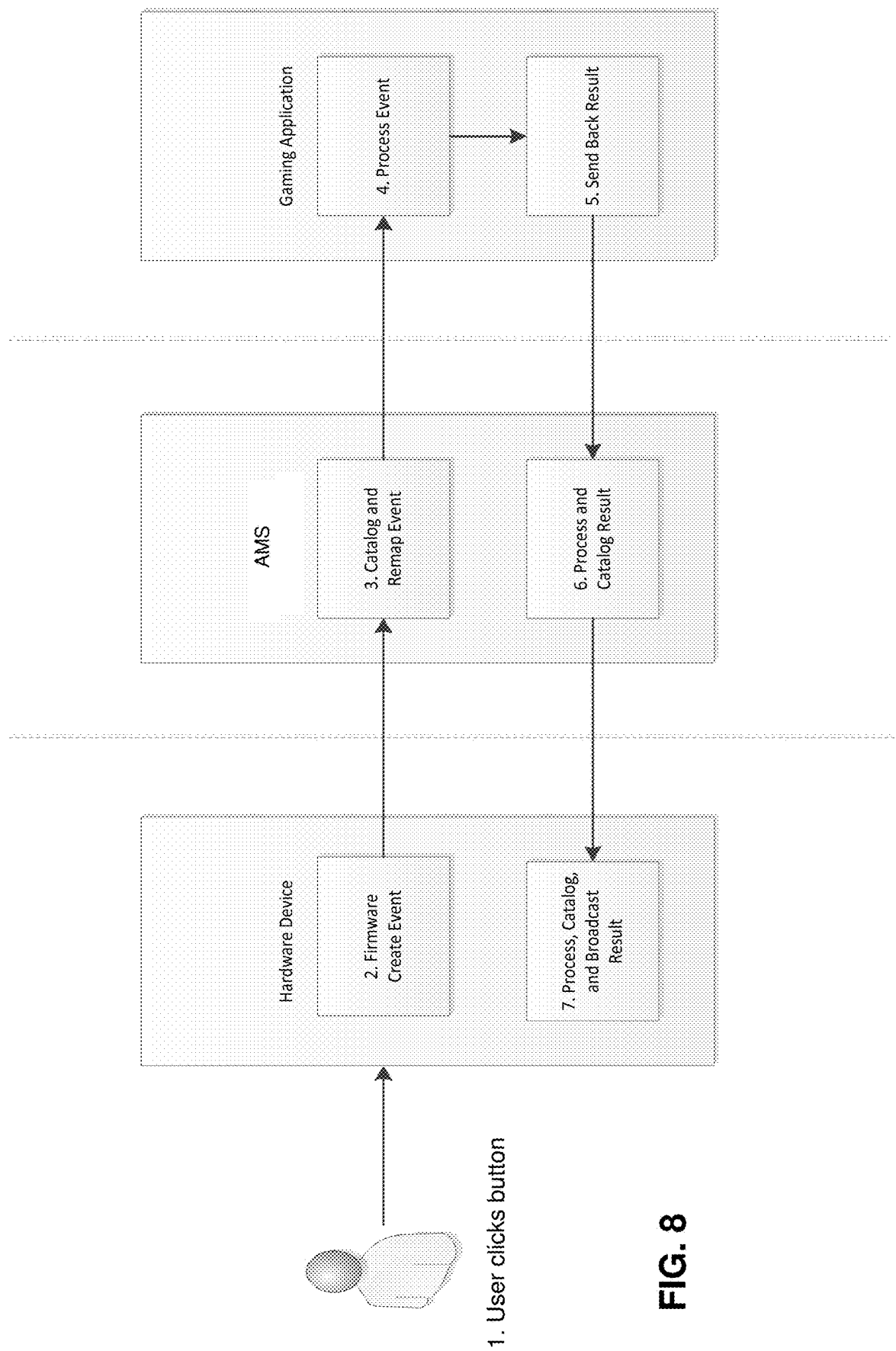
FIG. 8 depicts an illustrative embodiment of a system operating at least in part according to the methods of FIGS. 5-7D.
Figure 9:
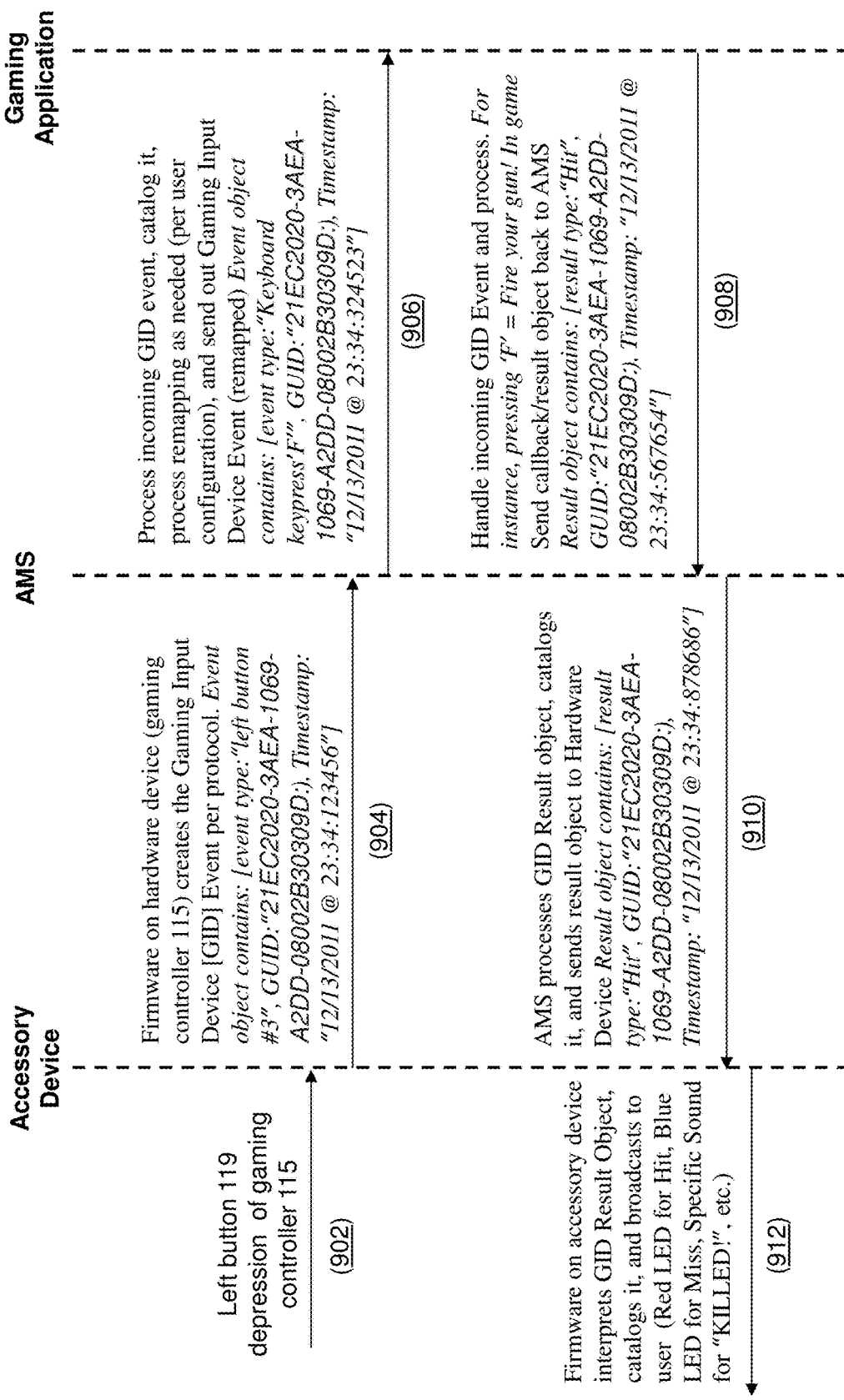
FIG. 9 depicts an illustrative embodiment of a communication flow diagram utilized by the system of FIG. 8.

FIGS. 8-9 illustrate embodiments of a system with a corresponding communication flow diagram for correlating stimulations and gaming action results. In this illustration a user clicks the left button 119 of the gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

Upon reviewing the embodiments, it would be evident to an artisan with ordinary skill in the art that the embodiments of the subject disclosure can be modified, reduced, or enhanced without departing from the scope of the claims described below. For example, the AMS application can be executed from an accessory 115 or computing device 206 to perform the embodiments described in the subject disclosure. The AMS application can also be operated from a remote server ("cloud services"). In yet another embodiment, functions of the AMS application can be distributed between devices. In yet another embodiment, the AMS application can be configured to track the performance of a gamer and adapt a threshold as the gamer improves or declines in performance.

For instance, as a gamer's performance improves with a gaming action, the threshold associated with the gaming action can be adapted to be less sensitive in detecting an over usage state. Similarly, the sensitivity of the threshold can be increased to promptly identify an over usage state of a gaming action if the gamer's performance declines as a result of an over usage of the gaming action. Additionally, the AMS application can be adapted to add gaming actions to an exclusion table when the gamer's performance substantially improves as a result of using the gaming action being excluded. The exclusion table can also be changed by the AMS application by removing a gaming action from the exclusion table responsive to its excessive use causing a decline in a gamer's performance.

Other embodiments can be applied to the subject disclosure.

Devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
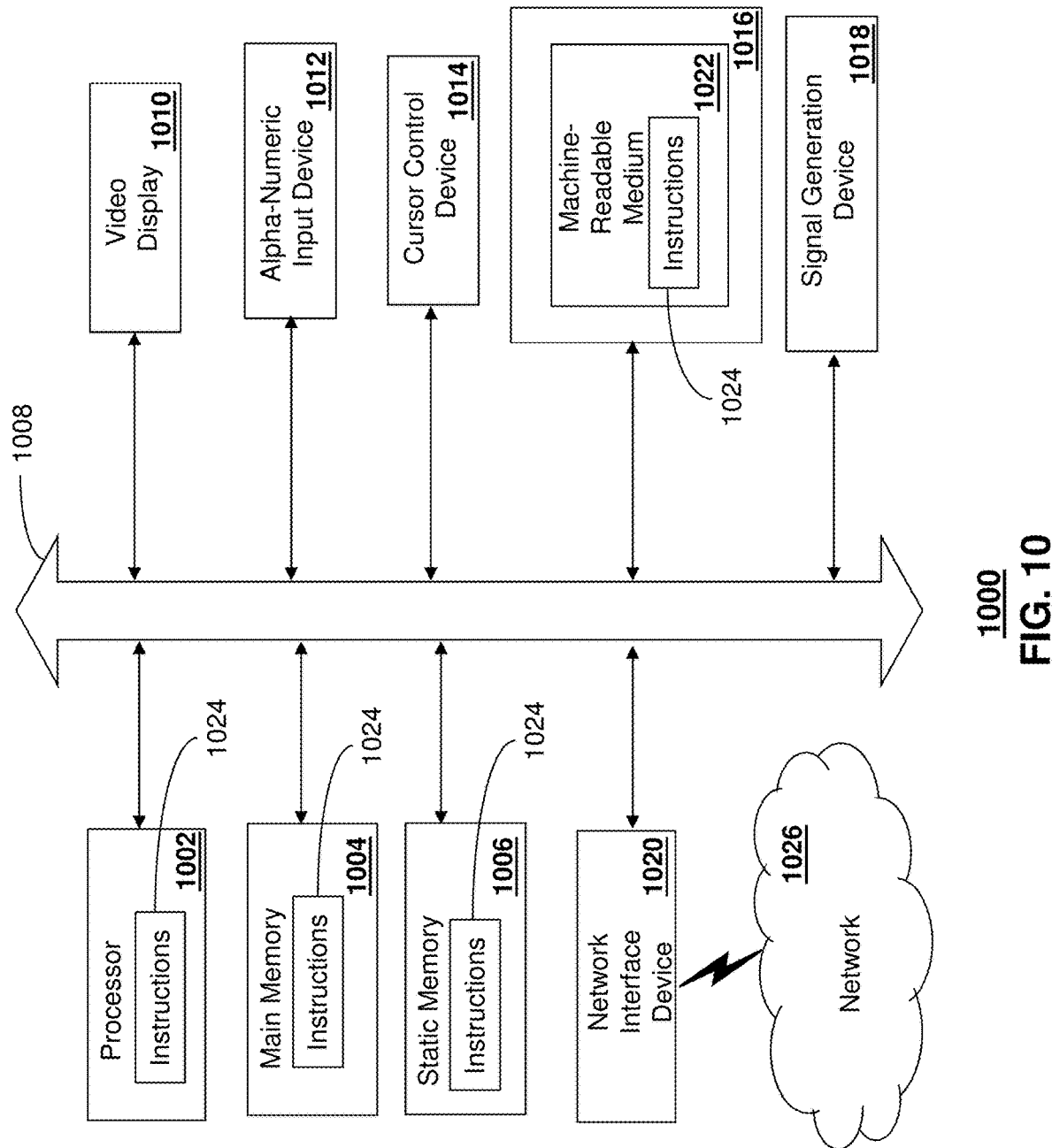
FIG. 10 depicts an illustrative diagrammatic representation of a machine in the form of a computer system within which a set of instructions, when executed, may cause the machine to perform any one or more of the methodologies disclosed herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as an accessory, computing device or combinations thereof. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000.

Figure 13:
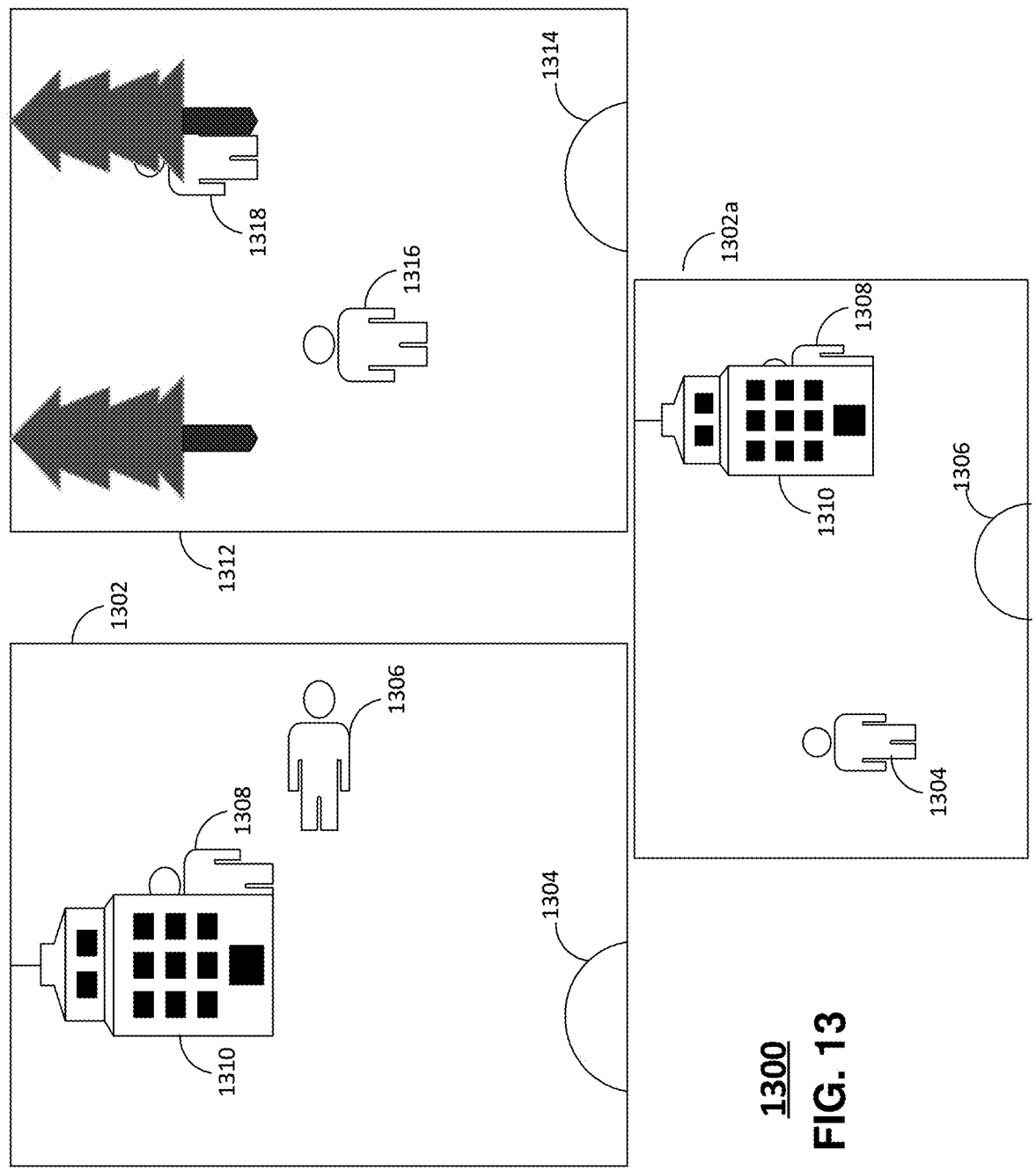
FIG. 13 depicts system to identify a group of possible trigger clips in accordance with aspects of this disclosure.
Figure 14:
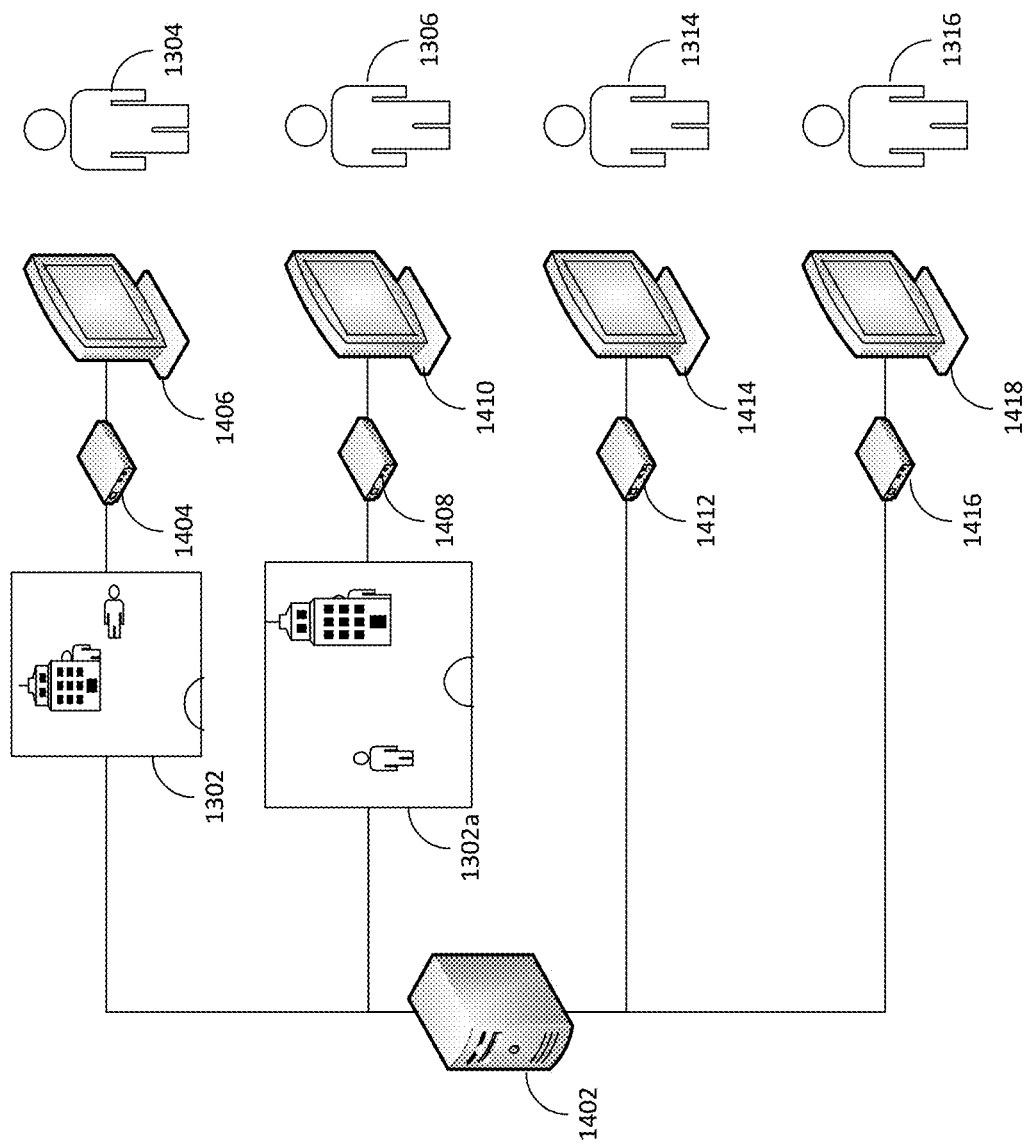
FIG. 14 depicts a system to distribute a group of trigger clips to a group of players in accordance with aspects of this disclosure.

FIG. 13 depicts system 1300 to identify a group of possible trigger clips in accordance with aspects of this disclosure and FIG. 14 depicts a system 1400 to distribute a group of trigger clips to a group of players in accordance with aspects of this disclosure. Referring to both FIGS. 13 and 14, in one or more embodiments, a computer server 1402 can implement a video game (hereafter video game server 1402) involving several different players 1304, 1306, 1308, 1314, 1316, and 1318 in different locations communicating with each other and the video game server 1402 over a communication network (e.g. Internet). Further, some players 1304, 1306, 1314, and 1316 can comprise one team playing the video game playing against another team of players 1308 and 1318. The gaming devices 1404, 1408, 1412, and 1416 are associated with each player 1304, 1306, 1314, and 1316 of one team.

In one or more embodiments, the video game server 1402 can detect a current trigger during a video game and record a trigger clip. A trigger is an event in the video game that a player may find significant and/or if reviewed, improve player performance in the future. Examples of triggers can include when a player makes a kill, makes a hit, takes a hit, loss of life, fired upon, implements weapon fire, loss of life of another player, change in ammunition, etc. A player may want to review triggers so as to avoid such actions/events (e.g. loss of life, takes a hit, fired upon, etc.) or to continue the actions/events (e.g. makes a kill, makes a hit, etc.) to improve video game performance in the future. A trigger clip is a portion of the video game that is recorded that contains the trigger. As described herein, a video game may have a sliding window of game content that it continuously records portions of the video game. Once the video game server 1402 identifies a trigger, the video game server 1402 can process the recorded sliding window/recorded portion of video game content that contains the trigger as the trigger clip. Further, the trigger clip can be provided and presented to a player for the player's review.

In one or more embodiments, the trigger clip is a recorded portion of the game content from the perspective or point of view of a player. In some embodiments, a trigger can involve one or more players. Thus, a distributed trigger clip may be requested or provided to all players involved in the trigger. That is, a distributed trigger clip is a group of trigger clips provided to each player involved in the trigger. Each trigger clip provided to each player is a portion of game content from the associated player's perspective or point of view. Referring to FIG. 13, a trigger clip 1302 of a war scenario video game can include a first player 1304 on a first team. The trigger clip 1302 can be from the perspective of the first player 1304. The trigger can be the loss of life of a second player 1306 of the first team. Further, the trigger clip 1302 can include a first player 1308 on a second team that is taking cover behind a building 1310. The first player 1304 of the first player may request to clip the trigger of the loss of life of the second player 1306 of the first team because the first player 1304 on the first team is unsure whether he/she killed the second player 1306 on the first team (i.e. loss of life due to friendly fire), or whether the first player 1308 on the second team killed the second player 1306 on the first team (i.e. loss of life due to enemy fire). The first player 1304 may want to review the trigger clip to review whether he/she committed friendly fire, and if so, avoid doing so in the future.

In one or more embodiments, the video game server 1402 can identify that the first player 1304 and the second 1306 on the first team are both involved in the trigger. Thus, the video game server 1402 can generate another trigger clip 1302*a* from the perspective of the second player 1306. Referring to FIG. 14, when requested by the first player 1304, the video game server can provide the distributed trigger clip, which comprises trigger clip 1302 and trigger clip 1302*a*. Trigger clip 1302 can be sent to gaming device 1404 associated with the first player 1304 over a communication network (wired, wireless, or a combination thereof) to be presented on display 1406 for review by the first player 1304. Further, trigger clip 1302*a* can be sent to gaming device 1408 associated with the second player 1306 (wired, wireless, or a combination thereof) to be presented on display 1410 for review by the first player 1306.

Referring to FIG. 13, a third player 1314 and a fourth player 1316 on the first team (same team as first player 1304 and second player 1306) are not involved in the trigger because they are in a different scene/setting 1312 of the video game battling a second player 1318 on the second team in a forest. Referring to FIG. 14, the video game server 1402 would identify that neither the third player 1314 nor the fourth player 1316 would not be provided with the distributed trigger clip because they were not involved with the trigger. Thus, even though the video game server 1402 is communicatively coupled to gaming devices 1412, 1416 and displays 1414 and 1418 associated with players 1314 and 1316 over a communication network (wired, wireless, or a combination thereof), the video game server 1402 would not provide the distributed trigger clip 1302, 1302*a* to gaming devices 1412 and 1416.

In one or more embodiments, the video game server 1402 can detect or identify a trigger by receiving user-generated input from the first player 1304, the user-generated input indicating to generate a clip according to the event/trigger and the players in involved in the event/trigger. The user-generated input can also include a timestamp. The user-generated input can be provided entering text input, gesture input (using a touchscreen graphical user interface), and/or voice input (involving voice recognition techniques) into the gaming device 1404. Further, the user-generated input provided to the gaming device 1404 is then transmitted to the video game server 1402 for further processing. The video game server 1402 can then record the distributed trigger clip (group of trigger clips) about the timestamp (e.g. 20 seconds before and after the indicated or detected trigger) included in the user-generated input (or detected otherwise) for the trigger/event and for the players indicated in the user-generated input.

In one or more embodiments, prior to detecting a trigger, the video game server 1402 can receive user-generated input (as described herein) indicating different events that are associated with different trigger types. For example, trigger types can include of kill, hit, weapon fire, loss of life of current player, loss of life of another player, and change in ammunition. The video game server 1402 can associate each event with a trigger type according to the user-generated input.

In one or more embodiments, the video game server 1402 can detect a trigger by implementing image recognition techniques to identify or otherwise determine that an event within a portion of game content is a trigger. In other embodiments, the video game server 1402 can access historical game content and identify a previous trigger within the historical game content. That is, the video game server 1402 can analyze historical game content to determine when an event was identified as a trigger according to its trigger type. Based on such a determination, the video game server 1402 can detect a current trigger by determining the current trigger/event is of the same type as the previous trigger.

In one or more embodiments, the detecting of a current trigger can include accessing training game content, acquiring machine learning techniques to identify different trigger from the different event from the training game content. That is, different events that are identified as different triggers in the training game content can be used to train an artificial intelligence engine on the video game server 1402 to acquire machine learning techniques to identify triggers in portions of game content in the future. Further, the detecting of a current trigger can comprise identifying the current trigger by using, or in response to, implementing the machine learning techniques on the portion of game content.

In one or more embodiments, the video game server can determine a group of players involved in a current trigger by identifying the group of players using, or in response to, implementing image recognition techniques on a trigger clip. In some embodiments, the video game server 1402 can determine the group of players involved in the current trigger by identifying the group of players by, or in response to, analyzing game action during the same time period each possible trigger clip in the group of trigger clips. That is, when the video game server 1402 identifies a trigger in a portion of game content from one player's perspective, the video game server can then generate a trigger clip for that player (i.e. record a portion of the game content from that player's perspective). However, the video game server 1402 can also record other portions of game content, each portion of game content from a different player's perspective. These group of portions of game content are possible trigger clips to comprise the distributed trigger clip. However, after determining only players involved in the trigger, the video game server 1402 discards portions of game content that are from perspective of players not involved in the trigger and generates the distributed trigger clip to comprise a group of portions of game content (i.e. trigger clips) from the perspective of each player involved in the trigger.

Figure 15A:
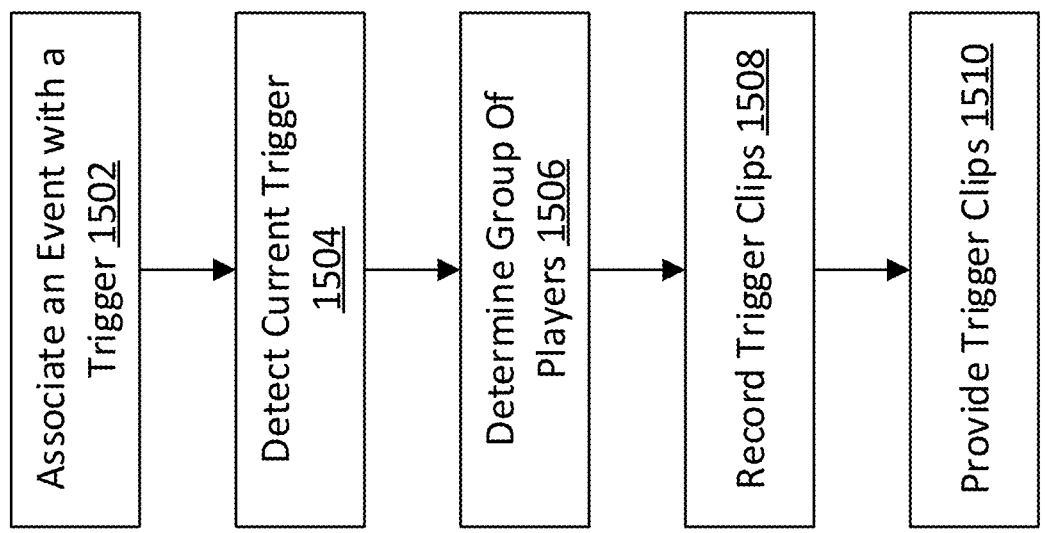
FIGS. 15A-D depict illustrative embodiments of methods utilized in the subject disclosure.

FIGS. 15A-D depict illustrative embodiments of methods utilized in the subject disclosure. Further, the methods depicted in FIGS. 15A-D can be implemented by a video game server as described herein. Referring to FIG. 15A, the method 1500 can include the video game server, at 1502, associating each event in a group of events with each trigger type from a group of trigger types. Further, the method 1500 can include the video game server, at 1504, detecting a current trigger during a video game. In addition, the method 1500 can include the video game server, at 1506, determining a group of players involved in the current trigger. Also, the method 1500 can include the video game server, at 1508, recording a trigger clip of game content for each player in the group of players resulting in a group of trigger clips. Each trigger clip of the group of trigger clips is a portion of game content that includes the current trigger from a perspective of each player of the group of players. Further, the method 1500 can include the video game server, at 1510, providing the group of trigger clips to a group of gaming devices over a communication network. Each gaming device of the group of gaming devices is associated with one player of the group of players.

Figure 15B:
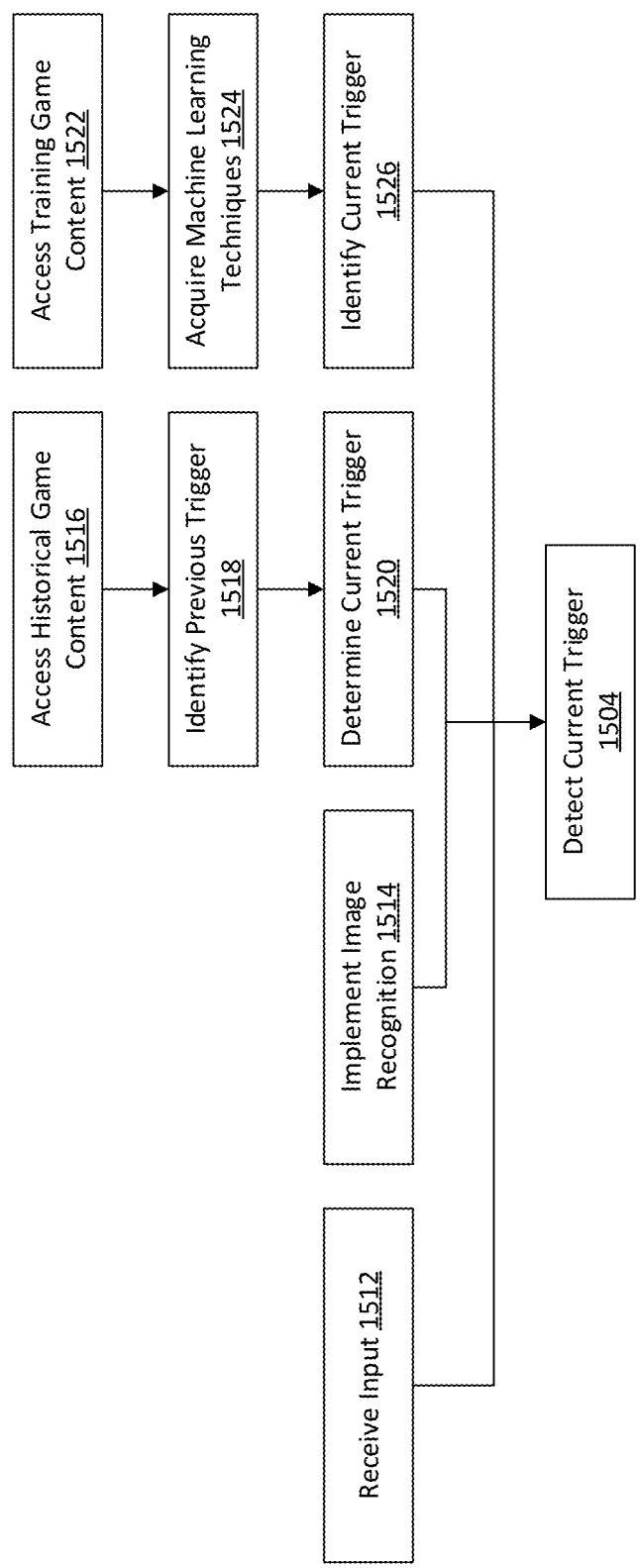

Referring to FIG. 15B, the method 1511 can implement detecting of the current trigger in different embodiments. The method 1511 can include the video game server, at 1512, receiving first user-generated input. The first user-generated input indicates the current trigger and/or to record the group of trigger clips. Further, the method 1511 can include the video game server, at 1514, implementing image recognition techniques on each portion of game content associated with each of trigger clip of the group of trigger clips to determine that an event occurred within each portion of game content such that the event comprises the current trigger. In addition, the method 1511 can include the video game server, at 1516, accessing historical game content. Also, the method 1511 can include the video game server, at 1518, identifying a previous trigger within the historical game content. Further, the method 1511 can include the video game server, at 1520, determining the current trigger is a same type of trigger as the previous trigger. In addition, the method 1511 can include the video game server, at 1522, accessing training game content. Also, the method 1511 can include the video game server, at 1524, acquiring machine learning techniques to identify different triggers from different events from the training game content. Further, the method 1511 can include the video game server, at 1526, identifying the current trigger in response to implementing the machine learning techniques on the portion of game content. In some embodiments, the current trigger comprises a trigger type, wherein the trigger type comprises one of kill, hit, weapon fire, loss of life of current player, loss of life of another player, and change in ammunition.

Figure 15C:
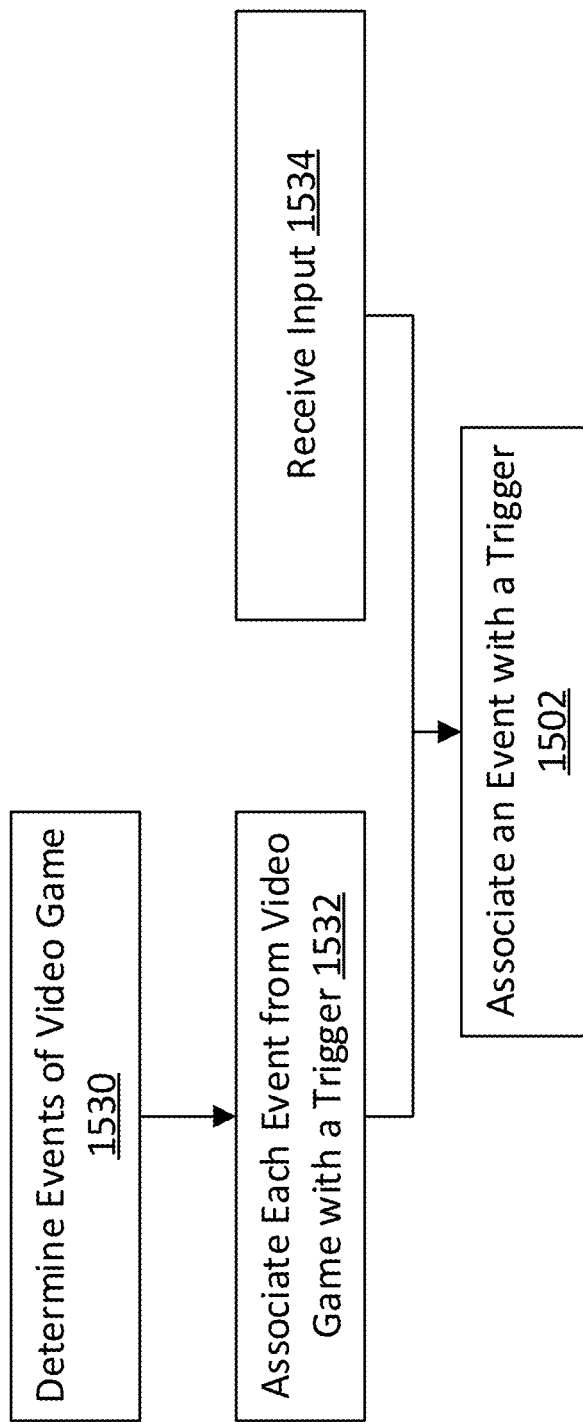

Referring to FIG. 15C, the associating an event with a trigger can be done by the video game server in different embodiments. The method 1531 can include the video game server, at 1530, determining the group of events of the video game. Further, the method 1531 can include the video game server, at 1532, associating each event in the group of events of the video game with each trigger type from the group of trigger types. In addition, the method 1531 can include the video game server, at 1534, receiving second user-generated input. The second user-generated input provides an indication of each event associated with each trigger type.

Figure 15D:
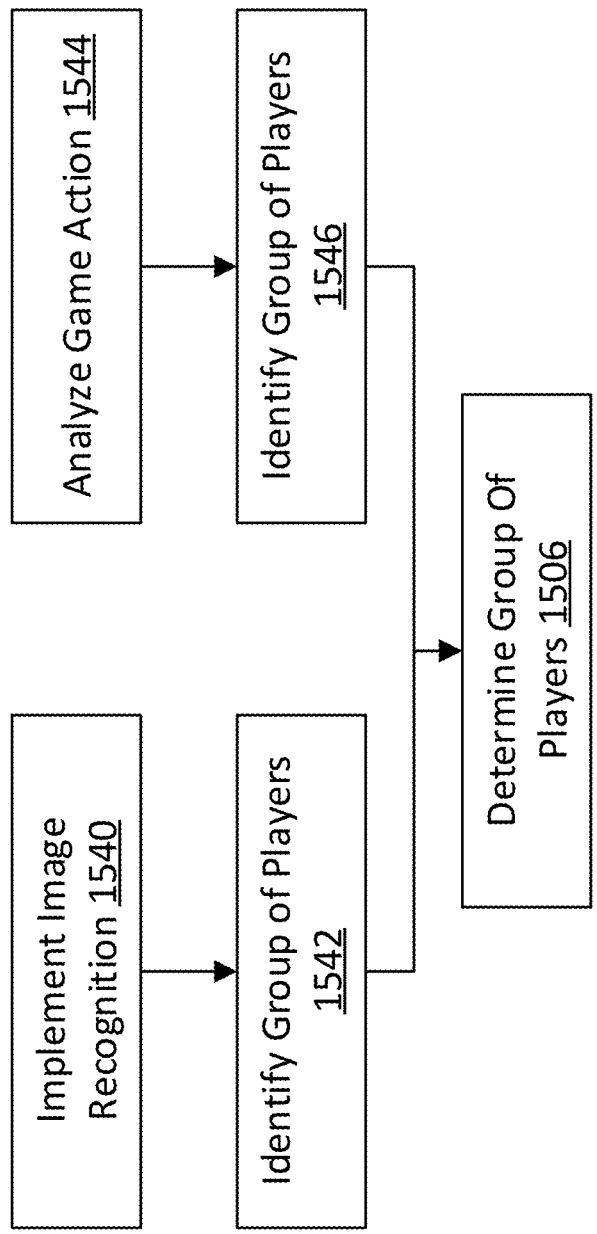

Referring to FIG. 15D, the determining the group of players involved in the current trigger can be done by the video game server in different embodiments. The method 1541 can include the video game server, at 1540, implementing image recognition techniques on each trigger clip of the group of trigger clips. In response, the method 1541 can include the video game server, at 1542, identifying the group of players. Further, the method 1541 can include the video game server, at 1544, analyzing game action during a same time period as each trigger clip of the group of trigger clips. In response, the method 1541 can include the video game server, at 1546, identifying the group of players. This analysis can include the video game server determining from game action the location of each player within the video game and determining the group of players involved in the current trigger by determining the location of each player within the game. Further, those players within a certain threshold distance from the event/current trigger are determined to be involved with the current trigger.

FIGS. 16A-D depict illustrative embodiments of methods utilized in the subject disclosure. Further, the methods depicted in FIGS. 16A-D can be implemented by a video game server as described herein or by any other suitable device operating in conjunction with the play or presentation of a video game by one or more game players or gamers.

In some embodiments, a player of a game may desire or elect to share a trigger clip with a third party, where the third party is not a current player of a current game in which the player is involved. For example, the game player may desire to send a trigger clip with a message to the third party. In one example, the message may be shared by attaching or otherwise incorporating the trigger clip with an instant message to be transmitted over a telecommunication network to a mobile device of the third party. In another example, the message may be shared as an electronic mail (email) message with the trigger clip attached to or incorporated in the message. Any related information, such as gaming statistics, may be transmitted with the trigger clip in the message. The message may be communicated over any suitable communication network such as a wireless radiotelephone network or WiFi network, cable television, digital subscriber line (DSL) or other networks. When the message is received by the third party, the third party may view the trigger clip on a mobile device such as a mobile telephone, tablet, a gaming console, a personal computer or other device. In such examples, the third party may respond with, for example, an instant message response or an email response. The response can be received and read by the player or gamer who initiated the message. Alternatively, the device receiving the message can be different from the device generating the message such as a first gaming console of a first device type and a second gaming console of a second device type.

In further embodiments, the game player may elect to send the trigger clip in a message with a temporary status. That is, the message will be set to expire after a predetermined time or after the trigger clip is viewed by the third party. The message may include data or instructions to time a timeout period after viewing of the trigger clip by the third party on a device and, at expiration of the timeout period, erase the trigger clip or otherwise make the trigger clip unavailable for further viewing. The message may be subject to other limitations or controls such as Digital Rights Management (DRM) control. Such limitations or controls may limit a device such as a gaming console, or a player, from share the message or other information with another device, for example.

In some embodiments, additional information or data may be added to the trigger clip, either for storage or for transmission in a message. For example, the video game server can collect recorded accessory game inputs and add those to the trigger clip as a digital watermark. Digital watermarking is the act of hiding information in multimedia data (video, audio or images), for the purposes of content protection or authentication.

Trigger clips may be annotated by a player or other individual after the trigger clip is completed. This may be done, for example, by using an editing function on a device such as a gaming console and, by the player, circling image content or adding arrows, lines or other graphical components to parts of one or more images in a frame clip. This may be done for any reasons, such as to highlight specific moments of interest, add text to describe the action displayed, to provide training or coaching in game play, etc. Moreover, audio commentary or audio annotation may be recorded and added to the trigger clip as well. When the trigger clip is stored in a library or sent to a third party, the annotations may be included as well. Some applications may include automated annotation in which, for example, a system such as the gaming console can add statistical information such as automatically determining and describing a kill streak.

Further, metadata can be collected and added to the trigger clip. Such metadata may include identification information for the game, identification information for the players, date of the gaming session, and gamer historical statistics, for example. Statistics can include other statistics, either automatically determined and/or provided by the user as input, that describe what occurred in clip such as 30 seconds without being killed where two flags were captured. Any suitable information can be collected as metadata. The metadata can be appended to a data file including the trigger clip in any suitable format or location in the file. The metadata may be encrypted or encapsulated in a manner to simplify retrieval or communication, to reduce data storage requirements, etc. When a game player elects to send a trigger clip to a third party, some or all the metadata may be included in the message.

In other embodiments, trigger clips may be shared to social media sites. For example, a player may initiate a request or command to share a trigger clip to a social media site such as Facebook® or Instagram®. The video game server will detect the command, format the social media posting as appropriate for the requested social media site, and post the trigger clip in the social media posting such as by communication of the social media posting over the internet to the social media site.

In other embodiments, one or more trigger clips may be stored in a library of trigger clips. The library may be contained in any suitable storage medium, such as a data-based in data communication over a network with the video game server. A player may cause the recording of a trigger clip and instruct the video game server to store the trigger clip in the library. Trigger clips in the library may be viewed later by the player, teammates of the player, or other persons. The trigger clips may be viewed and studied for purposes of performance analysis, training, coaching, etc. Suitable encoding and encryption may be applied to trigger clips stored in the library to limit access only to those with approved credentials or to reduce storage requirements. Any additional data, such as metadata, annotations or accessory game inputs, may be stored with the trigger clip in the library.

In some embodiments, the trigger clip may be stored with category information. Any suitable category information may be specified, such as "top kills in 5 seconds," or "highest-impact moments," or "up-and-coming players," or "grenade kills," as examples. Any category may be specified or selected by the player storing the trigger clip in the library. Further, any category may be specified or selected by the video game server when storing the trigger clip. For example, the video game server may automatically detect the content of the trigger clip and categorize or generate category information for the video clip accordingly, In other embodiments, the video game server may inspect metadata included with the video game and use the metadata to categorize or generate category information for the trigger clip. The trigger clip may be categorized according to a plurality of categories, such as by date recorded, game identifier, players involved, nature of the action recorded, etc.

In some embodiments, search requests may be submitted to the library for trigger clips matching specified search criteria. A game player or a third party with suitable access permission or credentials may submit the search request. The categories by which trigger clips may be stored may form search criteria. Other search criteria may include keywords contained in metadata or the nature of the action recorded in the trigger clip, etc. Searches may be based on image pattern recognition for particular objects or particular actions. Still other search criteria may relate to other players that were playing in the same game. Search results may be provided to the game player or other destination or recipient. The player or other recipient may select among the search results one or more trigger clips to view.

In one embodiment, the contents of the library may be searched as a tool for locating and recruiting potential team members or game players with game playing skills. For example, a team may require a specific skill such as "sharp-shooter." Trigger clips stored in the library may be categorized according to this skill and such trigger clips may be reviewed to locate a potential team member with the requisite skill. The reviewing may be done manually by one or more team members or automatically by the video game server or other device. When a suitable player with the requisite skill is located, the player may be contacted and recruited to join the team.

Relatedly, the library may be used as a repository of trigger clips forming a player's resume or curriculum vitae (CV). As a player experiences success at game play, she may store one or more trigger clips in the library as a demonstration of her skill and experience. Those trigger clips may be made available to others for searching to locate a player with desired skills. Those trigger clips may further be affirmatively shared by the player seeking to apply to a team. Those trigger clips may be shared in any suitable manner including those described herein. Other embodiments are disclosed as well.

Figure 16A:
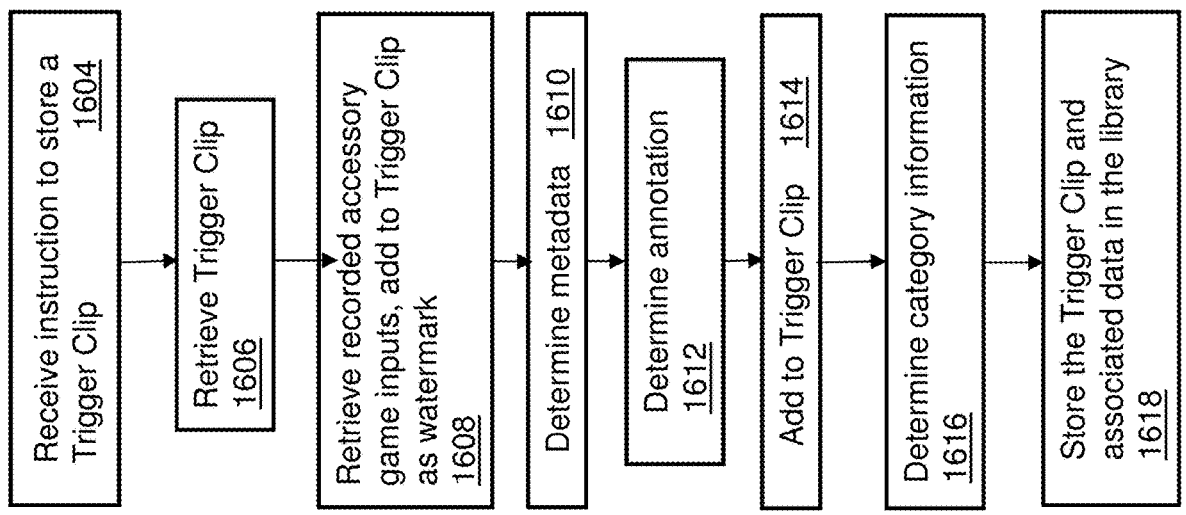
FIGS. 16A-D depict illustrative embodiments of methods utilized in the subject disclosure.

Referring to FIG. 16A, a method 1602 can include the video game server, at step 1604, receiving an instruction to store a trigger clip. The trigger clip in accordance with the subject disclosure may comprise a portion of game content that includes a stored trigger from a perspective of one or more players of a group of players of the game. The trigger clip may be recorded or prepared in any suitable fashion including the techniques described herein such as those described in conjunction with FIGS. 15A-D. The instruction may be received, for example, from one of the players of the game. The player may initiate the instruction by any suitable manner, such as actuating a gaming controller such as gaming controller 115 (FIG. 2) or through voice command detected by the video game server, for example. At step 1606, responsive to receiving the instruction to store the trigger clip, the video game server retrieves the specified trigger clip for further processing.

In the next several steps illustrated in the embodiment of FIG. 16A, the trigger clip may be supplemented with additional data or information. These steps may be executed optionally depending on capabilities of the system including the video game server or the nature of the request or instruction received from the gamer at step 1604. At step 1608, the video game server retrieves accessory game inputs. In some embodiments, this data may be added to the trigger clip as a digital watermark.

At block 1610, the video game server determines if there is metadata associated with the trigger clip. Metadata may be any data, from any source, that pertains to the trigger clip. Examples include identification information for the game which is the subject of the trigger clip, identification of players participating in the game or the trigger clip, date on which the gaming session occurred, etc. Other metadata may be collected and combined as well.

At block 1612, the video game server determines if there is an annotation associated with the trigger clip. In some embodiments, a player or another person may annotate a trigger clip with graphics or text displayed on the trigger clip. In other embodiments, the player or another person may provide an audio annotation. The data forming the annotation may be in any suitable format.

At step 1614, the metadata determined at step 1610, if any, and the annotation determined at step 1612, if any, are added to the trigger clip. The data may be added to the trigger clip in any suitable manner, such as by encoding the data or encrypting the data, or by supplementing a data file containing the trigger clip with the data to be added. In some examples, the added data or the trigger clip, or both, may be encrypted or otherwise made secure so that the data and/or the trigger clip can only be viewed or accessed by a user with proper access credentials such as a username and password.

At step 1616, the video game server determines category information for the trigger clip. Category information may be particularly useful for storing the trigger clip in a library, especially for subsequent searching and retrieval. Any suitable categorization may be used, such as information about the game which is the subject of the trigger clip, the players in the game and the date and time of the trigger clip. Further, category information may include ranking information, such as top kills in 5 seconds or most impactful moments in a game. The category information may relate to players, such as team membership, individuals identified as up-and-coming players or standout players. The category information may include information about the content captured by the trigger clip, such as a grenade kill or a sharpshooter kill. The category information may include any information specified by a player, including the player providing the instruction to store the trigger clip in step 1604, or by another player. The category information may be determined automatically, such as by the video game server, based on information such as accessory game inputs (step 1608), the metadata (step 1610), any annotations (step 1612), or other information.

At step 1618, the trigger clip and any associated data are stored in the library. Information forming the library may be stored in any suitable format or location, such as a database. The storage may be local or remote, accessible over a communication network. The information stored may include data forming the trigger clip, accessory game inputs, if any, the metadata, if any, annotations, if any, and category information. In some embodiments, the trigger clip may be stored with the category information searchable to locate and retrieve one or more trigger clips. For example, the category information may be indexed to serve as an input to a search engine to locate trigger clips with features of interest. The category information may include one or more categories and the category information may be searchable or categorized across one or more categories.

Figure 16B:
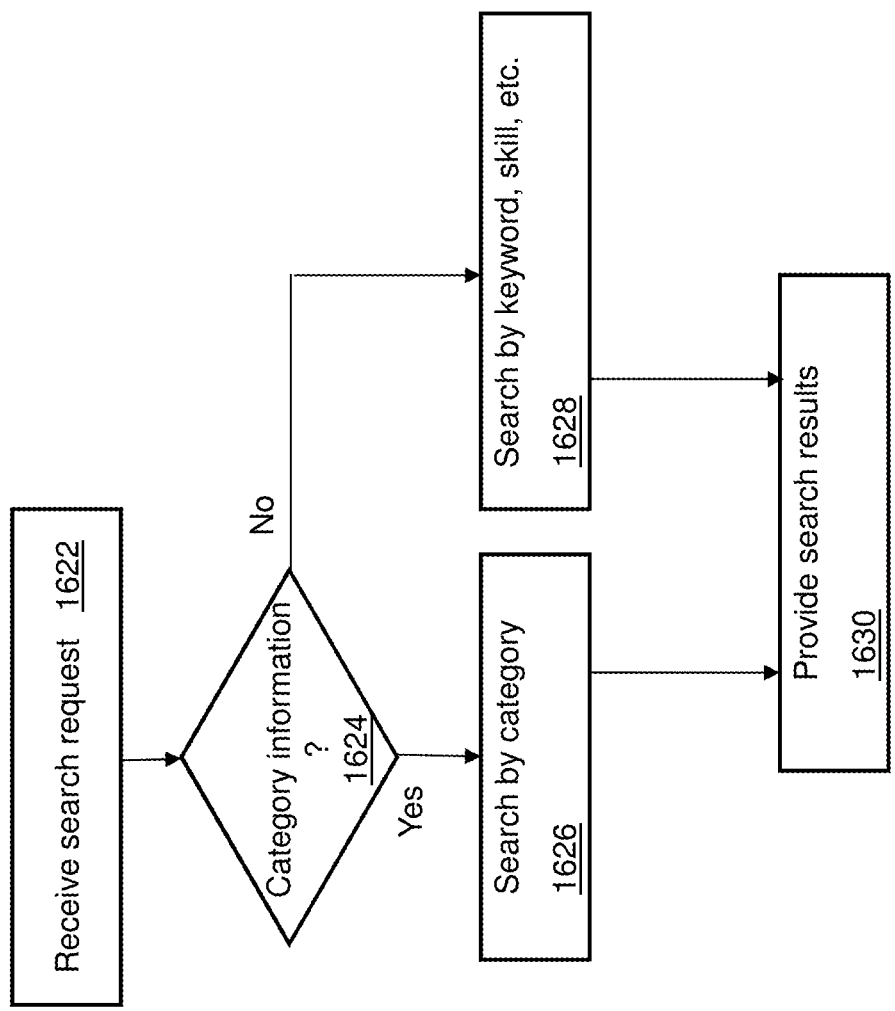

FIG. 16B illustrates a method 1620. The method 1620 can include the video game server, at step 1622, receiving a search request to locate and retrieve a stored trigger clip in a library. The trigger clip may have been stored in an embodiment consistent with the method 1602 illustrated in FIG. 16A. Alternatively, the trigger clip may be stored according to any other embodiment with other data or information. The operations of method 1620 may be performed by any suitable device such as a video game server in data communication with equipment such as a gaming console and a database. The search request may be received from the gaming console or other user device. Receiving the search request may include receiving appropriate credentials or other authorization to access the library. The video game server may access the database to locate and retrieve one or more trigger clips of interest.

At step 1624, the video game server may determine if the search request includes category information. The category information may be stored in a searchable manner with or for the trigger clips.

If the search request includes category information, the video game server searches the library using the category information, step 1626. For example, the category information may include categories of date, gamer identification, and content, such as "grenade kill." At step 1626, the video game server locates stored trigger clips having category information that matches the category information of the search request. In some embodiments, the category information of the search request or the category information stored with the trigger clips, or both, may be canonicalized to improve the matching performance. Any degree of matching may be used.

At step 1628, if the search request did not include category information, the video game server may search using any other suitable procedure. For example, the search request may include keywords such as "grenade kill," or specify a skill of interest such as "sharpshooter." The video game server may use such information to find a match among the trigger clips stored in the library, such as by matching information of the search request with metadata or annotations or other information stored with a trigger clip. The search request and searchable data of the library may be canonicalized.

In some embodiments, searching may be done both by category (step 1626) and by searching other data such as keywords (step 1628) or other search techniques. At step 1630, search results from the category search (step 1626) and/or the other data search (step 1628) are provided in response to the search request received at step 1622. The search results may include, for example, a list of trigger clips located by the search, thumbnails of images of the located trigger clips displayed on a web page, data or other information about the located trigger clips, etc. The search results may be organized in any suitable fashion, such as by time stamp, relevance, player identification, etc.

Figure 16C:
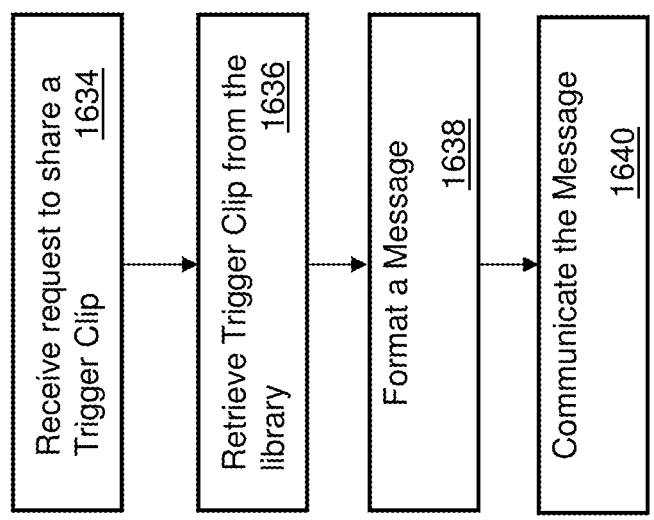

FIG. 16C illustrates a method 1632. The method 1632 can include the video game server, at step 1634, receiving a request to share either a newly created trigger clip or a stored trigger clip in a library. The trigger clip may have been created in an embodiment consistent with the methods illustrated in FIGS. 15A-D. The trigger clip may have been stored in a library in an embodiment consistent with the method 1602 illustrated in FIG. 16A. Alternatively, the trigger clip may be stored according to any other embodiment with other data or information. The operations of method 1632 may be performed by any suitable device such as a video game server in data communication with equipment such as a gaming console and a database. The request to share may be received from the gaming console or other user device. The video game server may access the database to locate and retrieve one or more trigger clips of interest.

At step 1636, one or more trigger clips is retrieved from the library. The trigger clip of interest may be identified and retrieved in any suitable manner, such as by a category search or other search, as described herein or otherwise implemented.

Figure 16D:
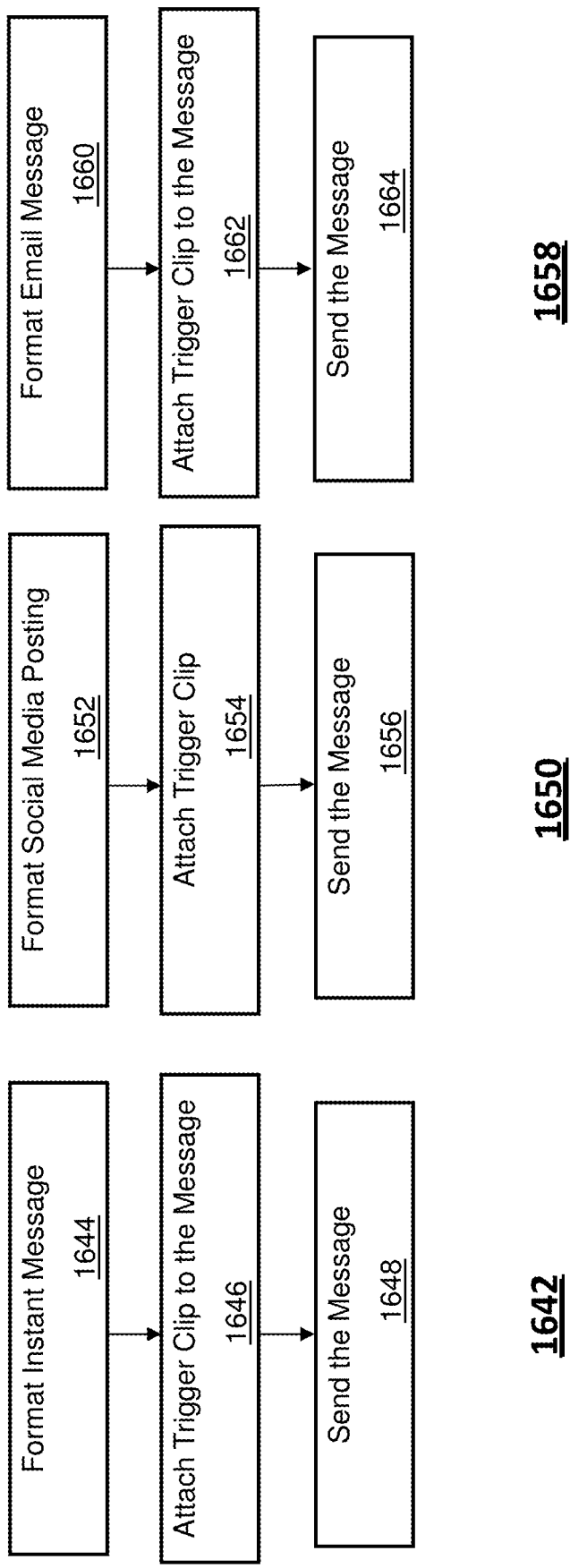

At step 1638, a message is formatted for sharing the trigger clip of interest responsive to the request received at step 1634. Any type of message or communication may be used to share the trigger clip of interest. FIG. 16D, discussed below, illustrates several exemplary embodiments.

At step 1640, the message for sharing the trigger clip is communicated. In some examples, a message consisting of formatted data is communicated over a data communication network to a recipient in accordance with the request received at step 1634. In some embodiments, the recipient may be a user device of one or more individuals and a message may be addressed for communication to the user device. In some embodiments, the recipient may be an addressable destination such as a web page or other networked resource.

FIG. 16D illustrates methods 1642, 1650 and 1658. The methods 1642, 1650 and 1658. can be performed by the video game server, for example. The methods 1642, 1650 and 1658 implement step 1638 of FIG. 16C to format a message in response to a request to share a trigger clip of interest (step 1634).

Method 1642 includes a step 1644 of formatting an instant message. An instant message may be, for example, a message to be sent according to the short message service (SMS) provided by some telecommunication technologies such as cellular communication networks. An instant message may be an iMessage according to the format specified and supported by Apple, Cupertino, Calif. Other messaging systems and conventions may be used as well, and generally include one or more destination addresses, a source address and message content formatted according to some standard.

At step 1646, the trigger clip of interest is attached to the message formatted in step 1644. Any suitable method of combining the trigger clip and the message may be used. For example, the trigger clip may be encrypted prior to attaching to the message. The message is sent at step 1648. The method for communicating the message at step 1648 is connected to the nature of the message formatted at step 1644.

Method 1650 includes a step 1644 of formatting a social media posting. A social media posting may be directed to a social media site such as Facebook® or Instagram®. At such a social media site, a trigger clip of interest may be displayed for viewing, commenting and sharing by third parties. For example, if a gamer who requested to share the trigger clip of interest has a Facebook account, she may request to share the trigger clip to her Facebook page. At that Facebook page, individuals having Facebook accounts linked to the gamer's Facebook page (e.g., Facebook friends) may view the trigger clip in a stream with other postings on their Facebook account. Other types of social media sharing are contemplated as well and should not be limited using Facebook as an example.

At step 1654, the trigger clip is included with or attached to the social media posting and a message including the social media posting is communicated. For example, the video game server, operating in response to a request to share the trigger clip (step 1634), may prepare the social media posting and then access the social media website to post the social media posting and trigger clip on the social media web site. The video game server may need to provide credentials, such as the requesting gamer's social media account information, to complete the posting.

Method 1658 includes a step 1660 of formatting an electronic mail (email) message. Any suitable email format or server may be used. Accessing the email server may involve providing suitable credential, such as account information for the game player requesting to share the trigger clip. Formatting the email message may include providing a destination address, information defining a subject of the message and text defining the body of the message. All of these may be specified by the request received from the game player requesting to share the trigger clip or may be retrieved automatically from storage, or a combination of these. At step 1662, the trigger clip is attached to or embedded in the message in any suitable form and the email message is sent over a communication network at step 1664.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Portions of some embodiments can be combined with portions of other embodiments.

Less than all the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. The processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device, comprising:
   a memory to store instructions; and
   a processor coupled to the memory, wherein responsive to executing the instructions, the processor performs operations comprising:
   receiving, by the processor, first user-generated input, wherein the first user-generated input comprises an indication of a trigger within a game to trigger storage of a trigger clip;
   accessing historical game content to train an artificial intelligence engine using machine learning to identify events in the historical game content corresponding to the trigger;
   detecting, by the processor, an occurrence in the game of one of the events corresponding to the trigger, wherein the detecting the occurrence of one of the events comprises processing game content by the artificial intelligence engine, and storing the trigger clip in response to the detecting the occurrence of the one of the events in the game, wherein the trigger clip comprises a portion of game content within the game that includes the occurrence of the one of the events that caused storage of the trigger clip, and wherein the trigger clip is from a perspective of one or more players of a group of players of the game;
   retrieving, by the processor, game input data for the game;
   adding, by the processor, the game input data to the trigger clip as a watermark visually overlaid on a video representation of gameplay in the trigger clip, wherein the watermark has a level of transparency to avoid obscuring the video representation of the gameplay in the trigger clip;
   detecting, by the processor, a request to share the trigger clip;
   retrieving, by the processor, the trigger clip according to the detecting the request;
   preparing, by the processor, the trigger clip for sharing according to the request, wherein preparing the trigger clip for sharing comprises: determining, by the processor, one or more recipients for the trigger clip; determining, by the processor, a lifespan for the trigger clip; and preparing, by the processor, a message including data defining the trigger clip, data defining the one or more recipients of the trigger clip, and data defining the lifespan of the trigger clip, wherein the trigger clip will only be viewable by the recipients during the lifespan of the trigger clip; and
   sharing, by the processor, the trigger clip according to the request, wherein the sharing the trigger clip comprises providing the trigger clip to one or more user devices over a communications network, wherein each user device of the one or more user devices is associated with a user who is not a player of the group of players, and wherein sharing the trigger clip comprises communicating, by the processor, the message over the communications network for receipt by user devices of the one or more recipients of the trigger clip.

2. The device of claim 1 wherein the message comprises an instant message.

3. The device of claim 1 wherein the operations further comprise receiving, over the communication network, an instant message response from a recipient of the instant message.

4. The device of claim 1 wherein the operations further comprise:
   retrieving, by the processor, metadata associated with the trigger clip, wherein the retrieving the metadata comprises retrieving one or more of:
      data defining the one or more players of the group of players of the game;
      data defining the game;
      data defining a date the game was played; and
      historical statistical data for the one or more of the players of the group of players of the game; and
   wherein preparing the trigger clip for sharing comprises combining, by the processor, the metadata with the trigger clip.

5. The device of claim 1 wherein sharing the trigger clip comprises:
   responsive to the request to share the trigger clip of the game, formatting, by the processor, the message including the trigger clip, the message addressed to the one or more user devices or one or more users associated with the one or more user devices according to the request to share the trigger clip.

6. The device of claim 5 wherein formatting the message comprises:
   formatting, by the processor, an instant message addressed to a mobile device of a user specified by the request; and
   attaching, by the processor, the trigger clip as an attachment to the instant message.

7. The device of claim 5 wherein retrieving a trigger clip comprises:
   retrieving, by the processor, the trigger clip from a library of trigger clips.

8. The device of claim 7 wherein the operations further comprise:
   determining, by the processor, a category of the trigger clip responsive to the detecting the request to share the trigger clip; and
   locating, by the processor, the trigger clip in the library of trigger clips based on the category of the trigger clip.

9. A method, comprising:
   receiving, by a processing system including a processor, first user-generated input, wherein the first user-generated input comprises an indication of a trigger within a game to trigger storage of a trigger clip;
   accessing, by the processing system, historical game content to train an artificial intelligence engine using machine learning to identify events in the historical game content corresponding to the trigger;

detecting, by the processing system, a plurality of occurrences of the events in the game, and recording a plurality of trigger clips in response to the detecting the plurality of occurrences of the events in the game, wherein the detecting the plurality of occurrences of the events comprises processing game content by the artificial intelligence engine, wherein each of the plurality of trigger clips comprises a portion of game content within the game that includes a corresponding one of the plurality of occurrences of the events, and wherein each of the plurality of trigger clips is from a perspective of one or more players of a group of players of the game;

retrieving, by the processing system, game input data for the game;

adding, by the processing system, the game input data to the plurality of trigger clips as a watermark visually overlaid on video representations of gameplay in the plurality of trigger clips, wherein the watermark has a level of transparency to avoid obscuring the video representation of the gameplay in the plurality of trigger clips;

storing, by the processing system, the plurality of trigger clips in a library of trigger clips according to category information;

receiving, by the processing system, a request to share a trigger clip of the plurality of trigger clips;

retrieving, by the processing system, the trigger clip from the library;

preparing, by the processing system, the trigger clip for sharing according to the request, wherein preparing the trigger clip for sharing comprises: determining, by the processing system, one or more recipients for the trigger clip; determining, by the processing system, a lifespan for the trigger clip; and preparing, by the processing system, a message including data defining the trigger clip, data defining the one or more recipients of the trigger clip, and data defining the lifespan of the trigger clip, wherein the trigger clip will only be viewable by the recipients during the lifespan of the trigger clip;

sharing, by the processing system, the trigger clip according to the request, wherein the sharing the trigger clip comprises providing the trigger clip to one or more user devices over a communications network, wherein each user device of the one or more user devices is associated with a user who is not a player of the group of players of the game, and wherein sharing the trigger clip comprises communicating, by the processing system, the message over the communications network for receipt by user devices of the one or more recipients of the trigger clip;

receiving, by the processing system, respective category information for each respective trigger clip of the plurality of trigger clips; and wherein the storing of the plurality of trigger clips comprises storing, by the processing system, each respective trigger clip according to the respective category information.

10. The method of claim 9, further comprising:

receiving, by the processing system, a request to view one or more trigger clips stored in the library;

retrieving, by the processing system, the one or more trigger clips from the library; and providing, by the processing system, the one or more trigger clips over a communication network for viewing.

11. The method of claim 10, further comprising:

receiving, by the processing system, one or more annotated trigger clips; and storing, by the processing system, the one or more annotated trigger clips in the library according to category information.

12. The method of claim 9, wherein each user device of the one or more user devices is associated with a user who is not a player of the group of players of the game.

13. The method of claim 9, wherein receiving respective category information comprises receiving, by the processing system, one or more of:

ranking information for each respective trigger clip of the one or more trigger clips;

player identification information for each respective trigger clip of the one or more trigger clips;

content summary information for each respective trigger clip of the one or more trigger clips; and timestamp information for each respective trigger clip of the one or more trigger clips.

14. The method of claim 9, further comprising:

receiving, by the processing system, from a player of the game, a search request to locate, in the library, trigger clips for viewing;

locating, by the processing system, one or more trigger clips in the library, wherein the locating is according to the search request; and providing, by the processing system, the one or more trigger clips to the player of the game.

15. The method of claim 9, further comprising:

receiving, by the processing system, from the player of the game, a sharing request to share a selected trigger clip of the plurality of trigger clips;

retrieving, by the processing system, the selected trigger clip from the library; and sharing, by the processing system, the selected trigger clip according to the sharing request, wherein the sharing the selected trigger clip comprises formatting, by the processing system, an instant message addressed to a mobile device of a user specified by the sharing request;

attaching, by the processing system, the selected trigger clip as an attachment to the instant message; and communicating the instant message over a communication network.

16. The method of claim 15, further comprising:

receiving, by the processing system, over the communication network, an instant message response from the mobile device of the user specified by the sharing request; and communicating, by the processing system, the instant message response to the player of the game.

17. The method of claim 9, further comprising:

receiving, by the processing system, from a player of the game, a search request to locate, in the library, trigger clips for viewing, wherein the receiving comprises receiving, by the processing system, category information defining a desired player skill set;

locating, by the processing system, one or more trigger clips in the library, wherein the locating is according to the category information;

providing, by the processing system, the one or more trigger clips to the player of the game;

receiving, by the processing system, a request to invite a recruited player associated with a trigger clip of the one or more trigger clips; and communicating the request to invite to the recruited player.

18. A non-transitory machine-readable medium, comprising executable instructions that, when executed by a processing system including a processor, facilitate performance of operations, the operations comprising:

receiving, by a processing system including a processor, first user-generated input, wherein the first user-generated input comprises an indication of a trigger within a game to trigger storage of a trigger clip;

accessing, by the processing system, historical game content to train an artificial intelligence engine using machine learning to identify events in the historical game content corresponding to the trigger;

detecting, by the processing system, a plurality of occurrences of the events in the game, and recording a plurality of trigger clips in response to the detecting the plurality of occurrences of the events in the game, wherein the detecting the plurality of occurrences of the events comprises processing game content by the artificial intelligence engine, wherein each of the plurality of trigger clips comprises a portion of game content within the game that includes a corresponding one of the plurality of occurrences of the events, and wherein each of the plurality of trigger clips is from a perspective of one or more players of a group of players of the game;

retrieving, by the processing system, game input data for the game;

adding, by the processing system, the game input data to the plurality of trigger clips as a watermark visually overlaid on video representations of gameplay in the plurality of trigger clips, wherein the watermark has a level of transparency to avoid obscuring the video representation of the gameplay in the plurality of trigger clips;

storing the plurality of trigger clips in a library of trigger clips according to category information;

receiving a request to share a trigger clip of the plurality of trigger clips;

preparing, by the processing system, the trigger clip for sharing according to the request, wherein preparing the trigger clip for sharing comprises: determining, by the processing system, one or more recipients for the trigger clip; determining, by the processing system, a lifespan for the trigger clip; and preparing, by the processing system, a message including data defining the trigger clip, data defining the one or more recipients of the trigger clip, and data defining the lifespan of the trigger clip, wherein the trigger clip will only be viewable by the recipients during the lifespan of the trigger clip;

formatting, responsive to the request to share, the message including the trigger clip; and communicating the message over a communication network to a social networking destination for receipt by user devices of the one or more recipients of the trigger clip.

19. The non-transitory machine-readable medium of claim 18, wherein the formatting the message comprises:

formatting an instant message for communication over the communication network to a user device of a user.

20. The non-transitory machine-readable medium of claim 18, wherein storing the plurality of trigger clips comprises:

determining respective metadata for each respective trigger clip of the plurality of trigger clips, wherein the determining respective metadata comprises determining, for each respective trigger clip, one or more of data defining the one or more players of the group of players of the game;

data defining the game;

data defining a date the game was played; and historical statistical data for the one or more of the players of the group of players of the game;

determining respective accessory game inputs of the one or more players of the group of players of the game;

determining respective category information for each respective trigger clip; and storing, in the library of trigger clips, each respective trigger clip with the respective metadata and the respective accessory game inputs, according to the respective category information.

* * * * *